US012616950B2

(12) United States Patent

Chalk et al.

(10) Patent No.: US 12,616,950 B2

(45) Date of Patent: May 5, 2026

(54) APPARATUSES AND PROCESSES FOR DISTILLATION AND DISTILLATION COLUMN ASSEMBLY

(71) Applicant: Air Products and Chemicals, Inc., Allentown, PA (US)

(72) Inventors: Clive Chalk, Wrexham (GB); Patrick Alan Houghton, Emmaus, PA (US); Jonathan Wilson, Cheshire (GB); Carl Thord Sacks, Macungie, PA (US); George Amir Meski, Allentown, PA (US)

(73) Assignee: AIR PRODCUTS AND CHEMICALS, INC., Allentown, PA (US)

( * ) Notice: Subject to any disclaimer, the term of this patent is extended or adjusted under 35 U.S.C. 154(b) by 319 days.

(21) Appl. No.: 18/491,968

(22) Filed: Oct. 23, 2023

(65) Prior Publication Data

US 2025/0128234 A1 Apr. 24, 2025

(51) Int. Cl.
B01D 3/32 (2006.01)
B01J 19/32 (2006.01)

(52) U.S. Cl.
CPC .............. B01J 19/32 (2013.01); B01D 3/32 (2013.01); *B01J 2219/3221* (2013.01); *B01J 2219/328* (2013.01)

(58) Field of Classification Search
CPC .............. B01J 19/32; B01J 2219/3221; B01J 2219/328; B01J 2219/32268; B01J 2219/32272; B01J 2219/32279; B01J 2219/32282; B01J 2219/32296; B01J 2219/32408; B01J 19/325; B01D 3/32
See application file for complete search history.

(56) References Cited

U.S. PATENT DOCUMENTS

| | | | |
|---|---|---|---|
| 2,804,292 | A | 8/1957 | Schilling |
| 3,402,105 | A | 9/1968 | Sze |

(Continued)

FOREIGN PATENT DOCUMENTS

| | | |
|---|---|---|
| CN | 1128506 A | 8/1996 |
| CN | 108430601 A | 8/2018 |

(Continued)

*Primary Examiner* — Dung H Bui
(74) *Attorney, Agent, or Firm* — Matthew R. Weaver

(57) ABSTRACT

An apparatus and process for distillation column fabrication can include forming multiple distillation column packing units that are positionable in a column to define a single packing section so that multiple columns of packing can be positioned in parallel with each other within a single distillation pressure vessel. Each of these multiple columns can have a pre-selected cross-sectional shape, such as a hexagonal shape, and each packing unit can have the same cross-sectional shape (e.g. hexagonal). Each column can include a riser, or distributor, attached to its upper or top portion. A plurality of outer jigsaw seal elements can be arranged between the outer portion of the columns and the inner wall of the pressure vessel. Each packing unit can include a plurality of layered corrugated sheets that are provided in a pre-selected arrangement to facilitate gas and liquid separation via the packing.

15 Claims, 13 Drawing Sheets

(56)                  References Cited

U.S. PATENT DOCUMENTS

| | | | | |
|---|---|---|---|---|
| 3,969,447 | A | * | 7/1976 | Glitsch ................ B01D 47/025 |
| | | | | 261/DIG. 11 |
| 4,208,284 | A | * | 6/1980 | Pretorius ................ G01N 30/52 |
| | | | | 210/767 |
| 4,719,090 | A | * | 1/1988 | Masaki ................ F28F 25/085 |
| | | | | 428/116 |
| 4,842,778 | A | * | 6/1989 | Chen ........................ B01J 19/32 |
| | | | | 261/97 |
| 4,950,430 | A | * | 8/1990 | Chen ........................ B01J 19/32 |
| | | | | 261/112.2 |
| 5,204,027 | A | * | 4/1993 | Armstrong ........... F28F 25/087 |
| | | | | 261/112.2 |
| 5,234,741 | A | * | 8/1993 | Kaffrell .................... B01J 19/32 |
| | | | | 428/184 |
| 5,320,651 | A | * | 6/1994 | Drummond ............. B01J 19/32 |
| | | | | 55/440 |
| 5,348,710 | A | * | 9/1994 | Johnson .................. B01J 19/32 |
| | | | | 261/95 |
| 5,470,542 | A | * | 11/1995 | Stringaro ................ B01J 19/32 |
| | | | | 422/652 |
| 5,683,493 | A | * | 11/1997 | Stober .................... B01D 53/18 |
| | | | | 95/219 |
| 5,700,403 | A | | 12/1997 | Billingham et al. |
| 5,730,843 | A | * | 3/1998 | Groten ...................... B01J 8/02 |
| | | | | 422/221 |
| 5,762,668 | A | * | 6/1998 | Lee ........................ B01D 3/324 |
| | | | | 55/486 |
| 5,779,993 | A | * | 7/1998 | Gentry .................. B01D 3/009 |
| | | | | 422/607 |
| 5,792,244 | A | * | 8/1998 | Morlec ............. B01J 20/28033 |
| | | | | 96/135 |
| 5,916,492 | A | * | 6/1999 | Bischoff ................ B01J 19/325 |
| | | | | 261/112.2 |
| 5,942,164 | A | * | 8/1999 | Tran ........................ B01D 3/20 |
| | | | | 165/60 |
| 5,984,282 | A | | 11/1999 | Armstrong et al. |
| 6,000,685 | A | * | 12/1999 | Groten .................... B01J 19/32 |
| | | | | 55/497 |
| 6,119,481 | A | * | 9/2000 | Sunder ................ F25J 3/04909 |
| | | | | 62/643 |
| 6,206,350 | B1 | * | 3/2001 | Harrison ................... F28C 1/16 |
| | | | | 261/DIG. 11 |
| 6,250,106 | B1 | | 6/2001 | Agrawal |
| 7,025,339 | B2 | | 4/2006 | Meski et al. |
| 9,956,540 | B1 | * | 5/2018 | Binkley ................. B01J 19/32 |
| 10,953,382 | B2 | * | 3/2021 | Nieuwoudt ............. B01J 19/32 |
| 2002/0050657 | A1 | * | 5/2002 | Werlen ................ F25J 3/04412 |
| | | | | 261/112.2 |
| 2002/0121711 | A1 | | 9/2002 | DeGarmo |
| 2003/0116871 | A1 | | 6/2003 | Ringo et al. |
| 2005/0070733 | A1 | * | 3/2005 | Sigl ........................ B01D 3/009 |
| | | | | 560/210 |
| 2007/0137482 | A1 | * | 6/2007 | Xu ......................... B01D 3/324 |
| | | | | 95/198 |
| 2007/0297956 | A1 | * | 12/2007 | Repasky .................. B01J 19/32 |
| | | | | 29/890 |
| 2010/0038593 | A1 | * | 2/2010 | He ........................... B01J 19/32 |
| | | | | 252/373 |
| 2010/0065501 | A1 | * | 3/2010 | Nieuwoudt ........... B01J 19/325 |
| | | | | 210/455 |
| 2013/0233016 | A1 | | 9/2013 | Wilson et al. |
| 2016/0061541 | A1 | * | 3/2016 | Chen ...................... F28F 25/08 |
| | | | | 261/97 |
| 2018/0318728 | A1 | * | 11/2018 | Steffens ................ C07C 263/20 |
| 2019/0299120 | A1 | * | 10/2019 | Xu ........................... B01D 3/26 |
| 2020/0290011 | A1 | * | 9/2020 | Belanger ................ B01D 3/28 |
| 2021/0087124 | A1 | * | 3/2021 | Krumm ................ B01J 8/0453 |
| 2021/0354106 | A1 | * | 11/2021 | Bhatelia .................. B01D 3/28 |
| 2022/0170701 | A1 | * | 6/2022 | Masliah .................. B01J 19/32 |
| 2022/0176312 | A1 | * | 6/2022 | Olmstead ............ B01D 53/185 |

FOREIGN PATENT DOCUMENTS

| | | | |
|---|---|---|---|
| EP | 0858830 | A1 | 8/1998 |
| EP | 3424590 | A1 | 1/2019 |
| GB | 931591 | A | 7/1963 |
| KR | 20210046803 | A | 4/2021 |

* cited by examiner

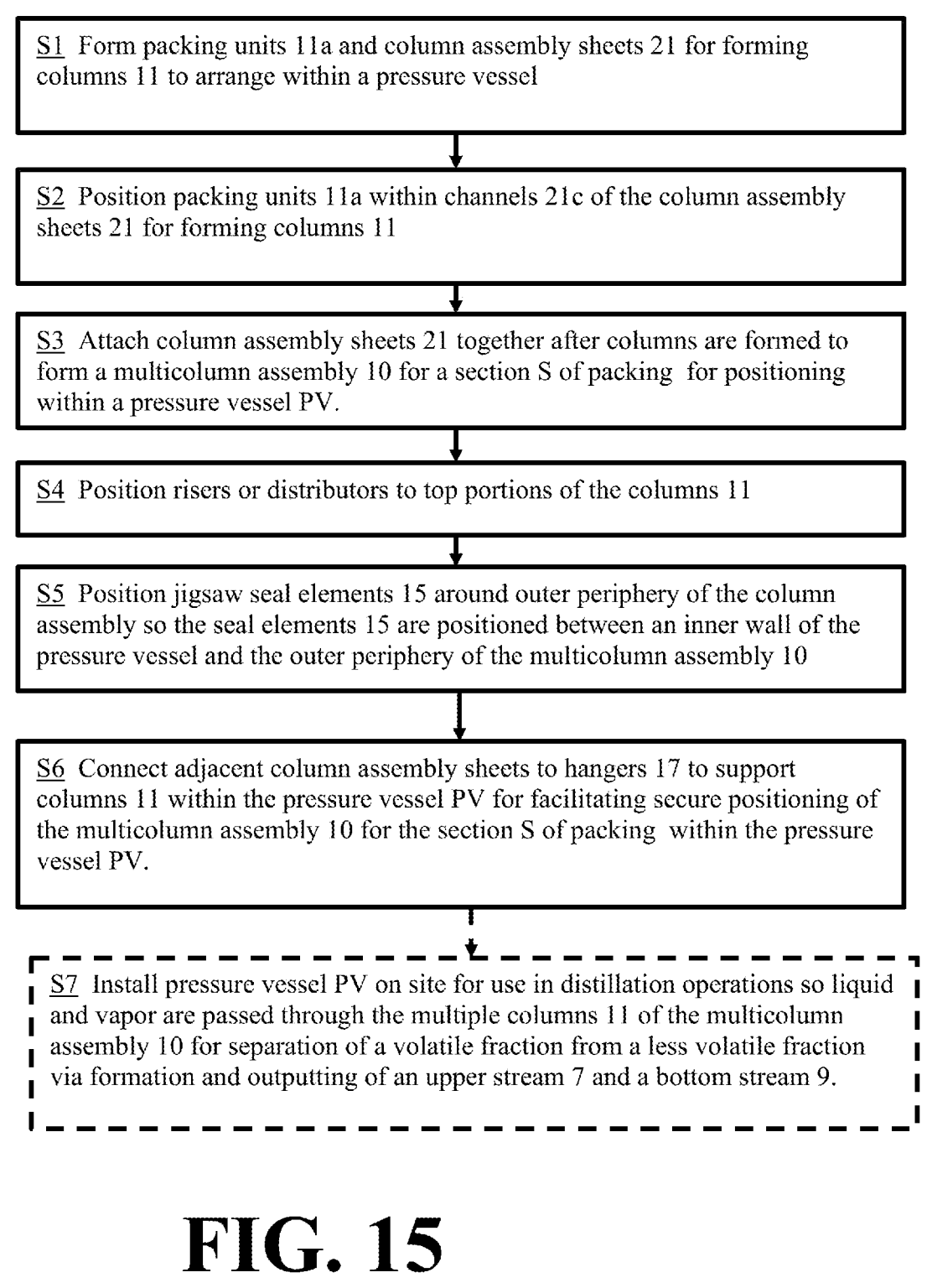

S1  Form packing units 11a and column assembly sheets 21 for forming columns 11 to arrange within a pressure vessel S2  Position packing units 11a within channels 21c of the column assembly sheets 21 for forming columns 11

S3  Attach column assembly sheets 21 together after columns are formed to form a multicolumn assembly 10 for a section S of packing for positioning within a pressure vessel PV.

S4  Position risers or distributors to top portions of the columns 11

S5  Position jigsaw seal elements 15 around outer periphery of the column assembly so the seal elements 15 are positioned between an inner wall of the pressure vessel and the outer periphery of the multicolumn assembly 10

S6  Connect adjacent column assembly sheets to hangers 17 to support columns 11 within the pressure vessel PV for facilitating secure positioning of the multicolumn assembly 10 for the section S of packing within the pressure vessel PV.

S7  Install pressure vessel PV on site for use in distillation operations so liquid and vapor are passed through the multiple columns 11 of the multicolumn assembly 10 for separation of a volatile fraction from a less volatile fraction via formation and outputting of an upper stream 7 and a bottom stream 9.

FIG. 15

APPARATUSES AND PROCESSES FOR DISTILLATION AND DISTILLATION COLUMN ASSEMBLY

FIELD

The present innovation relates to processes and systems for distillation column operation and fabrication and methods of making and using the same.

BACKGROUND

A form of distillation is an ongoing separation in which a mixture is continuously fed into the process and separated fractions are removed as output streams. The distillation process may produce at least two output fractions, which can include a volatile distillate fraction, which has boiled and been separately captured as a vapor and a residuum fraction, which is the least volatile residue that has not been separately captured as a vapor. In some arrangements, the residuum fraction is sometimes referred to as the bottom fraction and a more volatile distillate fraction can be referred to as a top fraction.

Examples of distillation columns and packing used for distillation columns can be appreciated from U.S. Pat. Nos. 7,025,339, 6,250,106, 5,984,282, 5,700,403, 3,402,105, and 2,804,292, U.S. Patent Application Publication Nos. 2013/0233016, 2003/0116871 and 2002/0121711, European Patent Application Publication Nos. EP 3 424 590 A1 and EP 0 858 830 A1, and United Kingdom Patent Application Publication No. GB 931,591A.

SUMMARY

We determined that conventional approaches to joining many small diameter distillation columns together to replace a single large diameter distillation column normally result in high manufacturing cost that makes multi-column packing arrangements for distillation impractical and unfeasible for implementation. Often, such approaches resulted in assemblies that had substantial increased weight and reduced processing area that increased the cost of fabrication and made processing less efficient, for example.

We have developed embodiments of a process and apparatus for distillation that can permit a single elongated pressure vessel having a relatively large diameter to be utilized to house a plurality of columns therein that can operate in parallel to provide improved distillation functionality while also permitting such an assembly to be fabricated in a more efficient manner that can avoid substantial overweight issues so that implementation can be feasible and utilizable in an industrial environment. In addition to reduced manufacturing costs and improved manufacturing flexibility that can permit fabrication and use, embodiments can provide improved distillation performance as well.

Embodiments of a system or distillation column assembly and embodiments of a process for distillation column assembly are also provided, which can facilitate the fabrication of embodiments of our distillation column and use of embodiments of our process for distillation. Embodiments of our system and process for distillation column assembly can permit fabrication to occur more quickly while also providing improved operational flexibility to facilitate fabrication of different sized columns for different design objectives. Embodiments can include automated processing to further facilitate efficient fabrication that can also occur more quickly and efficiently.

In a first aspect, an apparatus for distillation includes a pressure vessel having a chamber. The apparatus also includes a first multicolumn assembly positioned within the chamber. The first multicolumn assembly can include a plurality of interconnected columns. Each of the columns can have a plurality of packing units positioned within a channel of the column in linear alignment with each other. Each of the packing units can have a plurality of corrugated sheets of material encircled by at least one banding element such that the at least one banding element is positioned between the corrugated sheets of material and walls of the column that define the channel in which the packing unit is positioned.

In a second aspect, the columns can have a hexagonal cross-sectional shape and the packing units can have a corresponding hexagonal cross-sectional shape. The columns of the first multicolumn assembly can also define a honeycomb patterned structure of the multicolumn assembly. In other embodiments, the columns may have another type of shape (e.g. other polygonal shape, octagonal shape, etc.)

In a third aspect, the corrugated sheets of material can be corrugated sheets of metal or can be corrugated sheets of metal that have perforations defined therein and/or texture defined thereon.

In a fourth aspect, each banding element can include at least one seal element and a plurality of protuberances.

In a fifth aspect, one or more banding elements can include a first portion having a first terminal end and a second terminal end and a second portion having a first terminal end and a second terminal end. A connection mechanism of the first terminal end of the first portion can be connected to a connection mechanism of the first terminal end of the second portion. A connection mechanism of the second terminal end of the first portion can be connected to a connection mechanism of the second terminal end of the second portion.

In some embodiments, the connection mechanism of the first terminal end of the first portion can have a slot and the connection mechanism of the first terminal end of the second portion can have a projection positioned within the slot of the connection mechanism of the first terminal end of the first portion. The connection mechanism of the second terminal end of the first portion can also have a slot and the connection mechanism of the second terminal end of the second portion can have a projection positioned within the slot of the connection mechanism of the second terminal end of the first portion.

Each banding element can also have other features. For example, each banding unit can have at least one seal element and/or a plurality of protuberances.

In a sixth aspect, the apparatus can also include a plurality of hangers positioned in the chamber to support the first multicolumn assembly within the chamber. In some embodiments, each of the hangers can include an elongated member positioned in the chamber, a plurality of spaced apart fastener elements extending from the elongated member, and a plurality of clamping members. Each clamping member can be attached to a distal end of a respective one of the fastener elements.

In some embodiments, each of the clamping members can have a slot to receive walls of adjacent columns and at least one engagement element can be positionable in the clamping member to engage the walls within the slot.

In a seventh aspect, the apparatus can also include a plurality of riser assemblies. Each of the riser assemblies can be positioned in an upper end portion of a respective one of the columns of the multicolumn assembly. Walls of bottom portions of adjacent riser assemblies can be positioned within the slot for engagement with the at least one engagement element within the slot.

In an eighth aspect, the apparatus of the first aspect can include one or more features of the second aspect, third aspect, fourth aspect, fifth aspect, sixth aspect and/or seventh aspect. Examples of such combinations of features can be appreciated from the exemplary embodiments discussed herein. It should therefore be appreciated that other embodiments can include additional features or additional combinations of features.

In a ninth aspect, a process for fabrication and/or use of an apparatus for distillation is provided. Some embodiments of the process can include fabrication of the apparatus. Other embodiments can include use of the apparatus. Yet other embodiment can include fabrication and use of the apparatus. Some embodiments of the process can utilize an embodiment of the apparatus for distillation.

Embodiments of the process can include providing a plurality of packing units. Each of the packing units can have a plurality of corrugated sheets of material encircled by at least one banding element. The process can also include providing a plurality of column assembly sheets. Each of the column assembly sheets can be corrugated to have a plurality of flat walls and a plurality of angled walls. Each of the flat walls can extend from a first end to a second end. Each of the flat walls can have a first side and a second side opposite the first side between the first end and the second end, the plurality of flat walls can include a first flat wall and the plurality of angled walls can include a first angled wall extending form the first side of the first flat wall and a second angled wall extending from the second side of the first flat wall. The process can also include positioning the packing units in channels of a first column assembly sheet of the plurality of column assembly sheets and attaching a second column assembly sheet to the first column assembly sheet to enclose the packing units and form columns for forming a multicolumn assembly.

In a tenth aspect, the process can include attaching a riser assembly to an end portion of each of the columns. For instance, a first riser can be attached to an end portion of a first column and a second riser can be attached to an end portion of a second column. Additional risers can also be attached to additional end portions of additional columns.

In an eleventh aspect, the process can include positioning the multicolumn assembly within a chamber of a pressure vessel.

In a twelfth aspect, the process can include positioning jigsaw seal elements within a chamber of a pressure vessel between at least one wall of the pressure vessel and the multicolumn assembly to define an annular seal between the pressure vessel and the multicolumn assembly.

In a thirteenth aspect, the process can include connecting the multicolumn assembly to hangers positioned in the chamber. In some embodiments, each of the hangers can include an elongated member positioned in the chamber, a plurality of spaced apart fastener elements extending from the elongated member, and a plurality of clamping members. Each clamping member can be attached to a distal end of a respective one of the fastener elements. In some embodiments, each of the clamping members can have a slot to receive walls of adjacent columns and at least one engagement element can be positionable in the clamping member to engage the walls within the slot.

In a fourteenth aspect, the process can include passing a feed through the pressure vessel for distillation of the feed such that different portions of the feed passes through different columns in parallel to output an upper stream and a lower stream. In some embodiments the upper stream can be an upper stream that includes vapor and the lower stream can be a bottom stream that includes vapor, a liquid, or a combination of liquid and vapor. In some embodiments, there can also be at least one intermediate draw stream output from the vessel.

In a fifteenth aspect, the process of the ninth aspect can include one or more features of the tenth aspect, the eleventh aspect, the twelfth aspect, the thirteenth aspect, and/or the fourteenth aspect. Examples of such combinations of features can be appreciated from the exemplary embodiments discussed herein. It should therefore be appreciated that other embodiments can include additional features or additional combinations of features as well.

In a sixteenth aspect, a system for forming packing units for including in columns of a multicolumn assembly is provided. The system can include a cradle having a first portion that is moveable relative to a second portion for adjusting the cradle between a closed position and an open position. A first portion of a first banding element can be connectable to the first portion of the cradle when the cradle is in the open position. A second portion of a first banding element can be connectable to the second portion of the cradle when the cradle is in the open position. The open position of the cradle can be configured such that sheets of corrugated material are positionable on the first portion of the first banding element and sheets of corrugated material are positionable on the second portion of the second banding element. The cradle, first portion of the first banding element, and second portion of the first banding element can be configured so that movement of the cradle from the open position to the closed position connects terminal end portions of the first portion of the first banding element to terminal end portions of the second portion of the first banding element to form the first banding element to encircle the sheets of corrugated material to form a packing unit.

In a seventeenth aspect, the first portion of the first banding element can have a first terminal end and a second terminal end and the second portion of the first banding element can have a first terminal end and a second terminal end. A connection mechanism of the first terminal end of the first portion of the first banding element can be connected to a connection mechanism of the first terminal end of the second portion of the first banding element and a connection mechanism of the second terminal end of the first portion of the first banding element can be connected to a connection mechanism of the second terminal end of the second portion of the first banding element.

In some embodiments, the connection mechanism of the first terminal end of the first portion of the first banding element has a slot and the connection mechanism of the first terminal end of the second portion of the first banding element has a projection positioned within the slot of the connection mechanism of the first terminal end of the first portion of the first banding element. The connection mechanism of the second terminal end of the first portion of the first banding element can also have a slot and the connection mechanism of the second terminal end of the second portion of the first banding element can have a projection positioned within the slot of the connection mechanism of the second terminal end of the first portion of the first banding element.

In an eighteenth aspect, the system for forming packing units can include other features. Examples of such other features can be appreciated from the exemplary embodiments discussed herein. Also, embodiments of the system can be utilized in embodiments of the process for fabrication and/or use of an apparatus for distillation.

It should be appreciated that embodiments of the processes and apparatuses can utilize various conduit arrangements and process control elements. Embodiments may utilize sensors (e.g., pressure sensors, temperature sensors, flow rate sensors, concentration sensors, etc.), controllers, valves, piping, and other process control elements. Some embodiments can utilize an automated process control system and/or a distributed control system (DCS), for example. Various different conduit arrangements and process control systems can be utilized to meet a particular set of design criteria.

Other details, objects, and advantages of our process for distillation, distillation apparatus, distillation column fabrication systems, processes for distillation column fabrication, and methods of making and using the same will become apparent as the following description of certain exemplary embodiments thereof proceeds.

BRIEF DESCRIPTION OF THE DRAWINGS

Exemplary embodiments of processes for distillation, distillation apparatuses, processes for distillation column fabrication, distillation column fabrication systems, and methods of making and using the same are shown in the drawings included herewith. It should be understood that like reference characters used in the drawings may identify like components.

FIG. 15 is a flow chart illustrating an exemplary embodiment of a process for fabrication of an apparatus for distillation.

DETAILED DESCRIPTION

Figure 1:
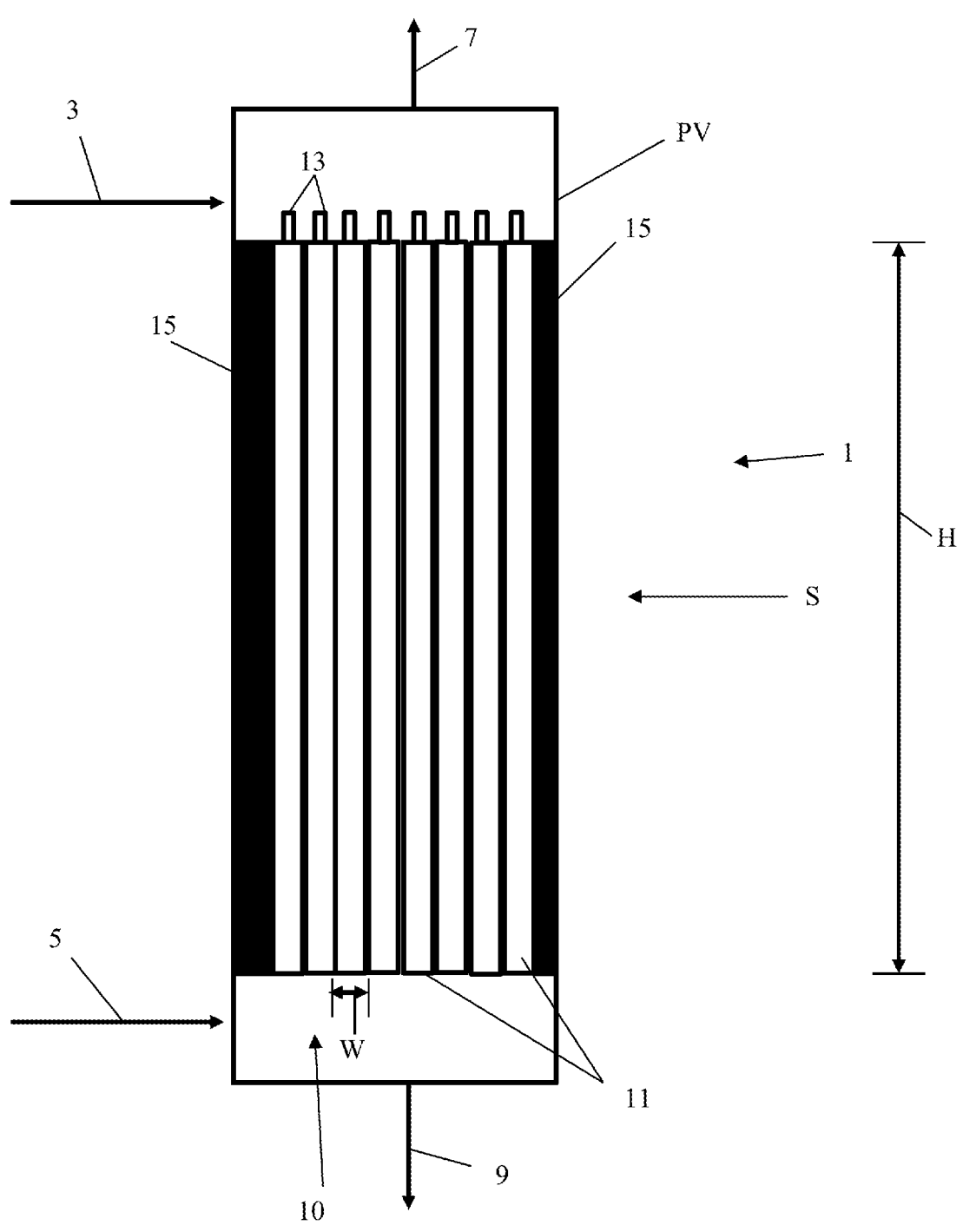
FIG. 1 is a schematic diagram of a first exemplary embodiment of our apparatus for distillation 1.

Referring to FIGS. 1-15, an apparatus for distillation 1 can be configured to include a single section S of packing within a pressure vessel PV having a first multicolumn assembly 10 or multiples sections S of packing within a pressure vessel PV having at least a first multicolumn assembly 10 of a first section S of packing and a second multicolumn assembly 10 of a second section S of packing. Other embodiments can utilize one or more additional sections S of packing that can each include an additional multicolumn assembly 10 as well. When multiple sections S are utilized, the sections S can be spaced apart from each other within the pressure vessel PV.

Some embodiments can be configured for air separation distillation applications. Other embodiments can be configured to other types of distillation applications (e.g. petroleum processing distillation applications as well as other distillation applications).

The packing of a section S of packing can be arranged to facilitate a flow of fluid within the pressure vessel PV to facilitate distillation so that a feed of fluid fed to the pressure vessel can undergo separation, or distillation, so that a higher volatile content of one or more constituents within the feed can be more concentrated in an upper stream 7 output from the pressure vessel PV and a less volatile content of one or more constituents within the feed can be more concentrated in a lower stream 9. The upper stream 7 can be considered a volatile distillate fraction of the feed and the lower stream 9 can be considered a residuum fraction or bottom fraction of the feed.

Each section S can have a height H. In embodiments having multiple sections S, each section can have the same height or different sections S can have different heights. For instance, an upper section can have a greater or lesser height than a lower section S. For multiple section columns, the diameter or width of each section S can be the same or can be different as well.

The feed fed to the pressure vessel PV to undergo separation via distillation within the pressure vessel PV can include a first stream of feed 3 and a second stream of feed 5. The first stream of feed 3 can include a liquid portion of feed 3 or be a liquid stream in some embodiments. In some situations, the first stream of feed 3 can be a reflux stream or can include a reflux stream as well. The second stream of feed 5 can be a vapor feed or include vapor.

Figure 2:
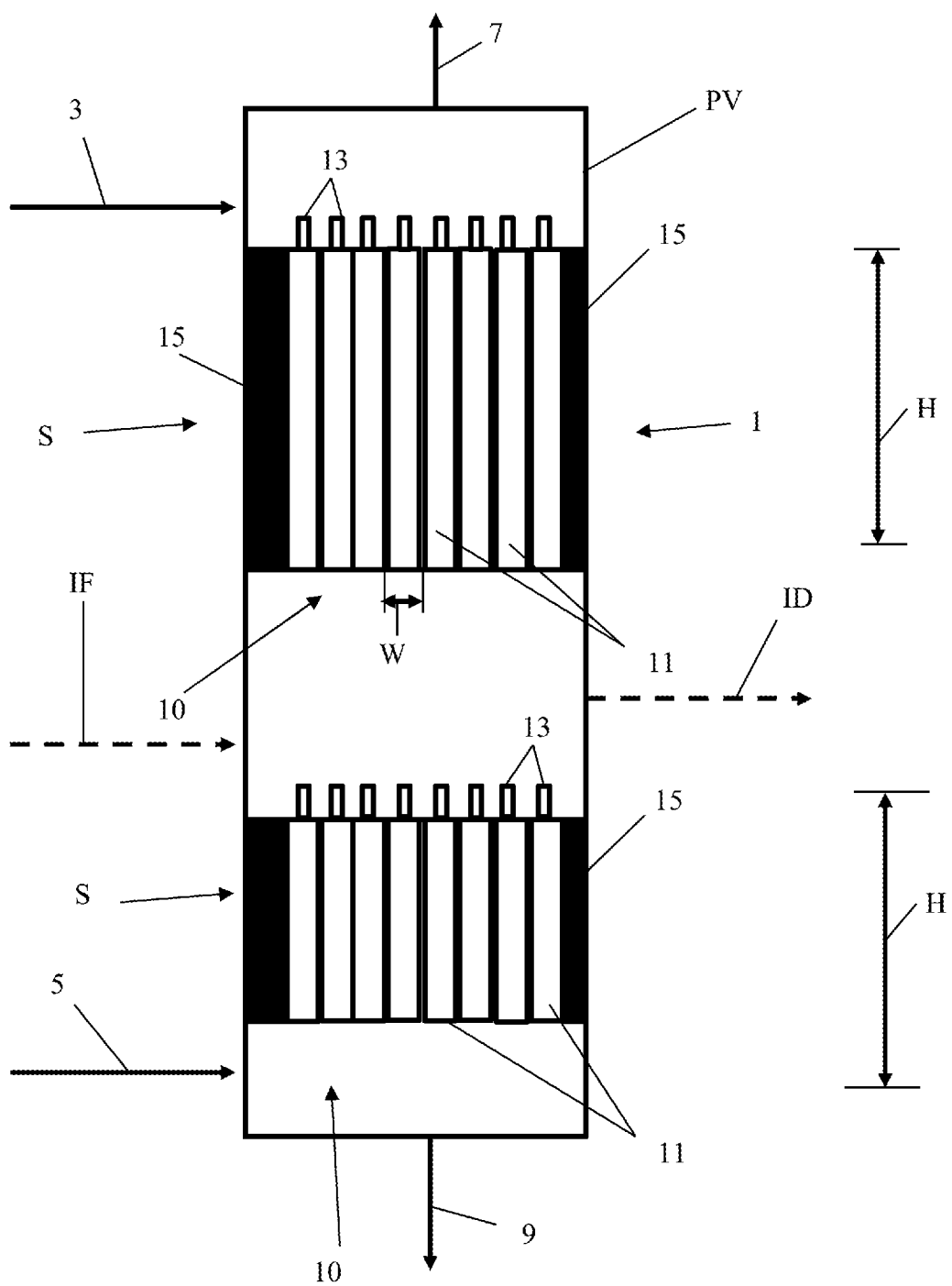
FIG. 2 is a schematic diagram of a second exemplary embodiment of our apparatus for distillation 1.
Figure 3:
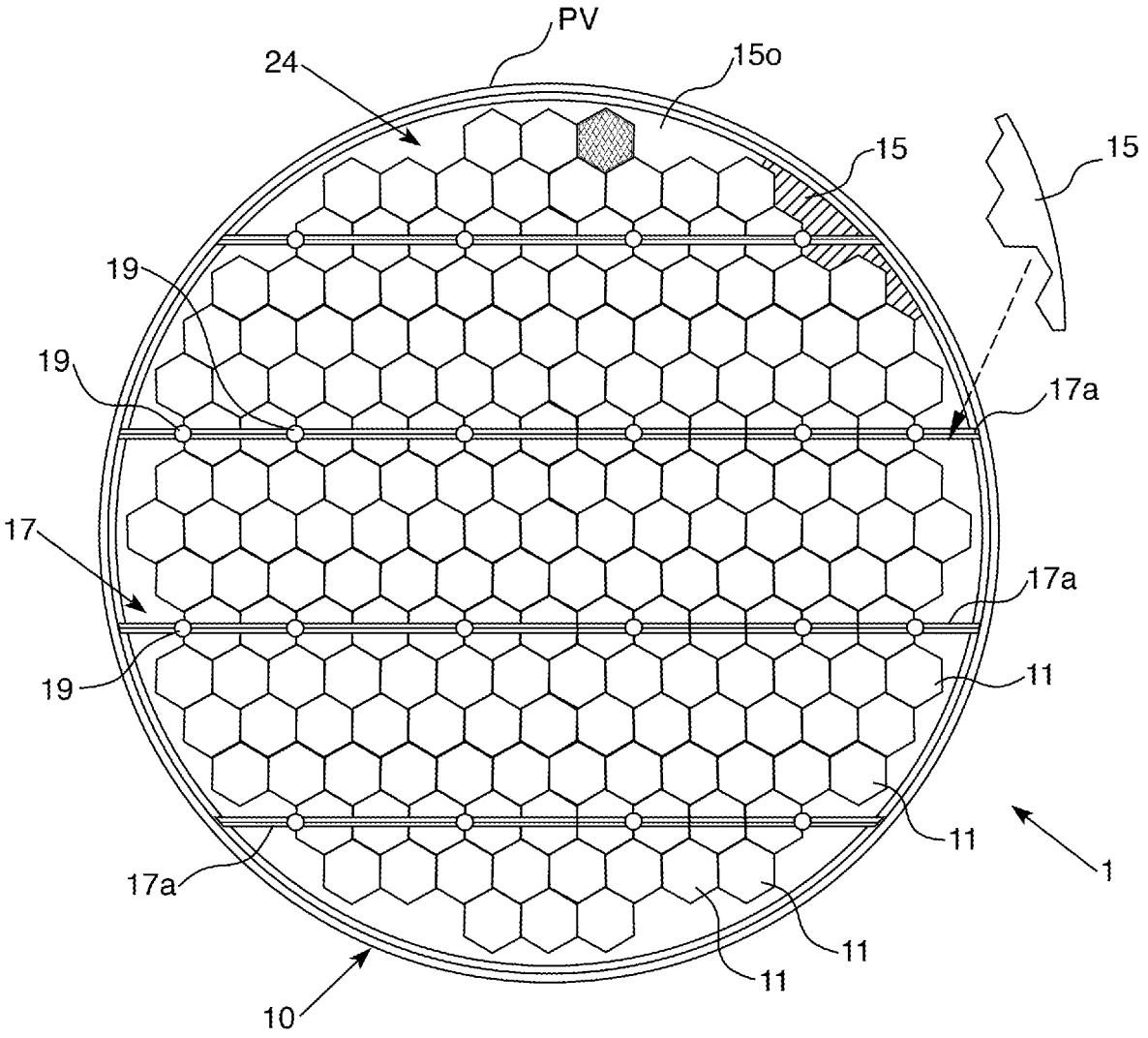
FIG. 3 is a schematic cross-sectional view of an exemplary embodiment of our apparatus for distillation 1 to illustrate positioning of jigsaw seal elements 15 between an inner wall of a pressure vessel PV and the outer periphery walls of the multicolumn assembly 10.

The pressure vessel PV can also receive one or more other intermediate feed streams IF (shown in broken line in FIG. 2). Each intermediate feed stream IF can include a feed fluid to undergo separation via distillation (e.g. can include a vapor, a mix of vapor and liquid, or liquid, etc.).

The feed can include multiple constituents that can include at least a first constituent and a second constituent. These constituents can be included in the first stream of feed 3 and the second stream of feed 5, for example.

The first constituent can be more volatile than the second constituent. During the distillation process within the pressure vessel, the different fluid of the feed can pass through the packing of the pressure vessel PV such that the first constituent is more concentrated in a first stream of fluid for being output as within the upper stream 7 and the second constituent can be more concentrated in the second stream of fluid for being output within the lower stream 9. The fluid can pass through the section or sections of packing S to facilitate interactions between the different fluids to facilitate heat and mass transfer for separation of the different constituents of the feed for forming the upper stream 7 and the lower stream 9.

For example, the feed stream can include oxygen and nitrogen in some embodiments that can be configured for air separation or the separation of nitrogen from oxygen. The nitrogen can be the first constituent and the oxygen can be the second constituent. In such embodiments, the first upper stream 7 can include a substantial amount of nitrogen (e.g. be between 80 mole percent nitrogen to 100 mole percent nitrogen, between 80 mole percent nitrogen and 99 mole percent nitrogen, etc.) and the lower stream 9 can include a substantial amount of oxygen (e.g. be between 50 mole percent oxygen and 100 mole percent oxygen, be between 60 mole percent oxygen and 99 mole percent oxygen, etc.). In other embodiments, the feed can also include Argon (Ar) and/or other constituents as well (e.g. rare gases such as Xenon (Xe) and/or Krypton (Kr)). These examples for the feed can be utilized in air separation distillation applications. it should be appreciated that other embodiments can utilize other feeds for other types of distillation applications (e.g. petroleum processing distillation applications, etc.).

It should be appreciated that there may be other streams fed to the pressure vessel PV to facilitate distillation operations (e.g. there can be additional streams of feed). There may also be at least one stream of reflux provided to the pressure vessel in some embodiments. In some embodiments, the pressure vessel and sections S can be arranged and configured to facilitate the output of one or more other product stream (e.g. at least one intermediate stream between the upper stream 7 and lower stream 9). For example, one or more intermediate output streams ID can be output to provide other output flows of fluid that has undergone separation within the pressure vessel. Each intermediate output stream ID can include a fluid (e.g. be a vapor, be a liquid, include a mix of vapor and liquid, etc.).

The pressure vessel PV can be a body that has an inner chamber in which one or more sections S of packing can be provided. The packing can be positioned in the chamber between outer seal elements 15 that can be arranged to form an annular seal between an inner wall of the pressure vessel PV that defines the chamber and a multicolumn assembly 10 of a plurality of interconnected columns 11 of packing. The seal elements 15 can be positioned within gaps 150 defined between outer walls of the columns 11 of the multicolumn assembly 10 and the inner side of at least one wall of the pressure vessel PV that defines the chamber of the pressure vessel PV to form the annular shaped seal, for example. The seal elements 15 can be positioned to form the annular seal to help cause the fluid fed into the pressure vessel PV to flow through the packing of the columns 11 within the chamber of the pressure vessel PV instead of bypassing the packing.

Each column 11 of packing can include a plurality of aligned packing units 11a. Each packing unit 11a can include a plurality of layers of corrugated material that can be arranged in a pre-selected packing pattern to facilitate a desired interaction between fluid for distillation. The layers of corrugated material can be layers of corrugated sheets of material 11cs (e.g. corrugated sheets of metal, corrugated sheets of steel, corrugated sheets of aluminum, corrugated sheets of plastic that have perforations and/or surface enhancements defined therein or formed therein (e.g. defined texture, etc.) that are arranged and bundled together to define a body of the packing unit 11a. Multiple packing units 11a can be installed with each other sequentially for defining a column 11.

The multiple packing units 11a can include wipers (e.g. banding elements 12) and spacers to maintain appropriate gaps between the packing elements and the walls of column 11 and to help prevent liquid and vapor by-pass between the packing units 11a and the walls of column 11. The multiple packing units 11a may be installed in the columns 11 by rotating each unit by a specific angle, such as 90° or other suitable angle.

Each column 11 of packing can include multiple packing units 11a. Each column 11 can be attached to other columns 11 of packing to define an assembly 24 of columns 11 for the multicolumn assembly 10.

The columns 11 can be elongated in a vertical direction so that each of the packing units 11a are vertically aligned with each other to define the column 11. The elongated vertical direction can be a height H of the column 11, for example. This direction can be transverse (e.g. perpendicular) to a width W (which can also be the diameter) or thickness of the column 11.

Each column 11 and packing unit 11a can also have a pre-selected cross-sectional shape. The pre-selected cross-sectional shape can be a polygonal shape. For example, the packing units 11a and columns 11 can have a hexagonal shape or other suitable polygonal shape (e.g. octagonal, pentagonal, etc.). For columns 11 with a polygonal shape, the packing units 11a can be installed into the columns 11 by rotating each unit by the angle defining the sides of the polygon. For example, packing units 11a installed in a square column can have a rotation angle of 90°, packing units 11a installed in a hexagonal column can have a rotation angle of 60°, etc. In other embodiments, the pre-selected cross sectional shape can be circular or oval.

The pressure vessel PV can be elongated and have a cross-sectional shape that can be any suitable type of shape. For example, the pressure vessel can be tubular in shape, pipe-like in shape, or have another type of shape in which the cross-sectional shape of the pressure vessel is polygonal, circular, oval, or other suitable shape. The pressure vessel can be elongated to define a height and the diameter or width of the pressure vessel PV can be perpendicular to the height, for example.

Each column 11 can have an upper end attached to a riser assembly 13. For example, there can be a single riser assembly 13 attached to a respective column 11 for all the columns of the multicolumn assembly 10. In some embodiments, each riser assembly 13 can be configured to facilitate a flow of vapor out of the column 11 to which it is attached and also facilitate a downward flow of liquid through the packing of the column 11 to which it is attached.

Figures 11, 12:
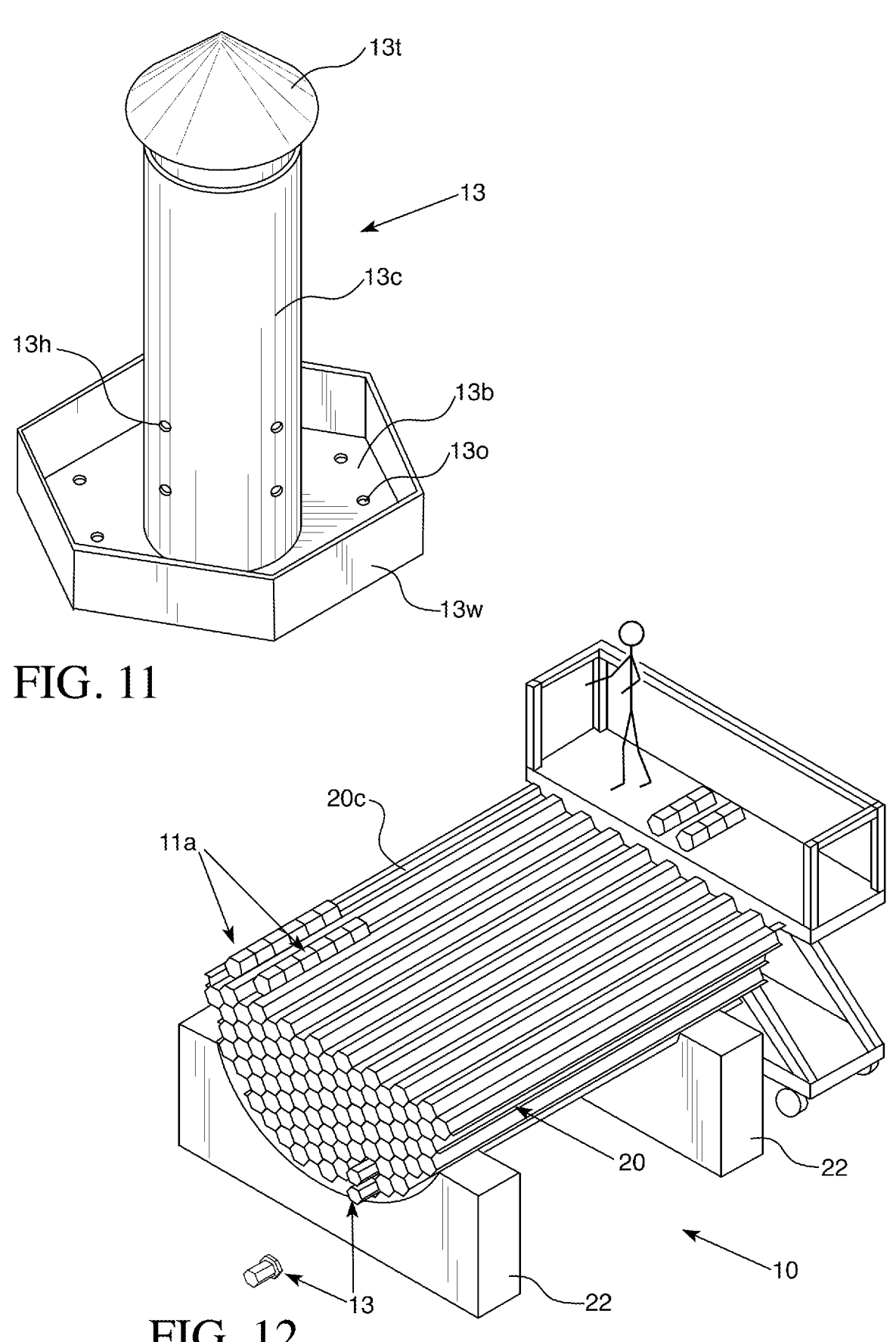
FIG. 11 is a perspective view of an exemplary embodiment of a riser assembly 13 (which can also be referred to as a distributor assembly) that can be included in an exemplary embodiment of a multicolumn assembly 10 that can be used in exemplary embodiments of our apparatus for distillation 1.
FIG. 12 is a schematic illustration of an exemplary fabrication process for forming a multicolumn assembly 10 that has riser assemblies 13 attached to columns 11 of the multicolumn assembly 10.
Figures 13, 14:
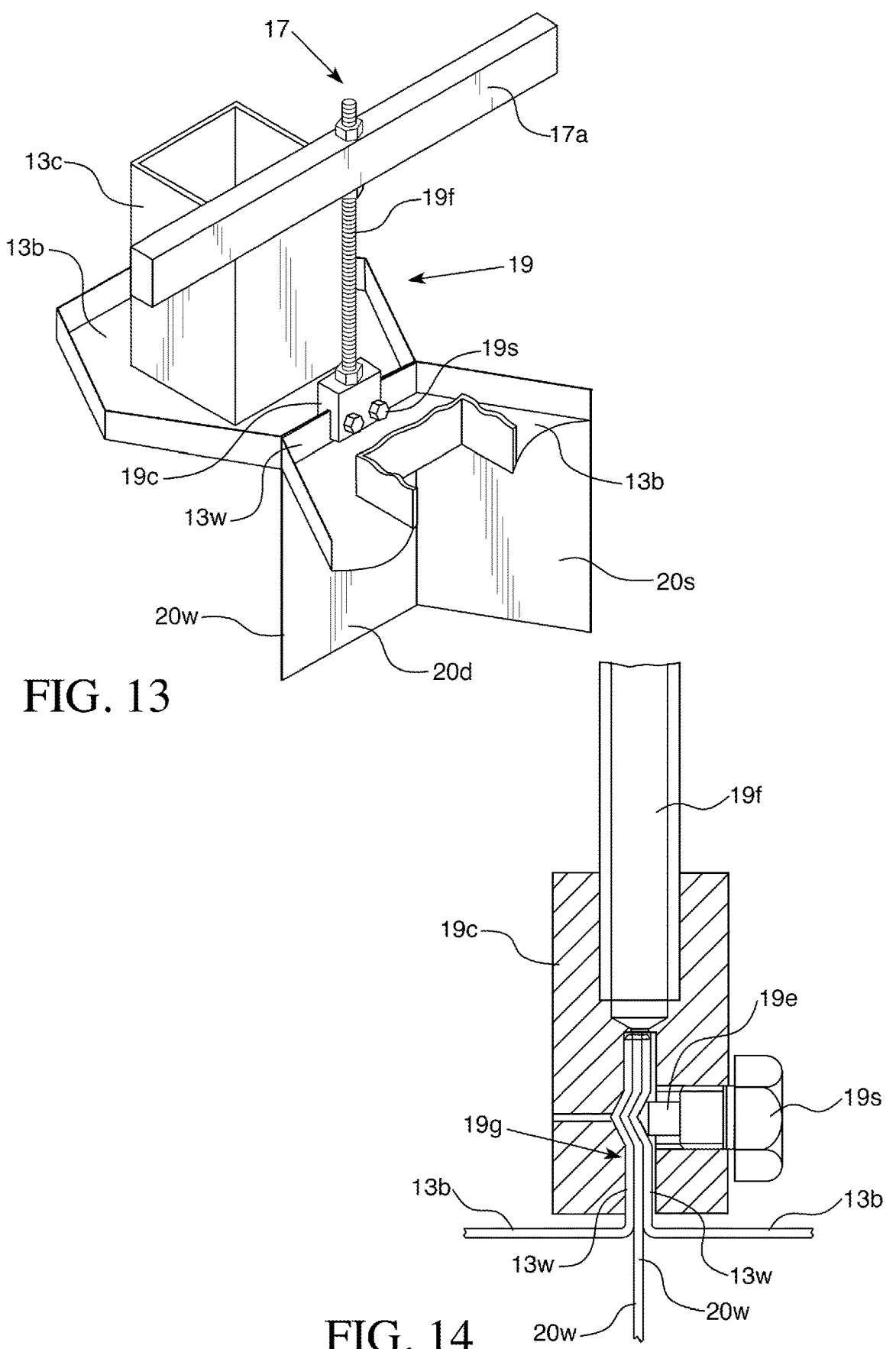
FIG. 13 is a fragmentary schematic illustration of an exemplary arrangement for attaching a hanger 17 to columns 11 to support the multicolumn assembly 10 within a pressure vessel PV.
FIG. 14 is a cross-sectional schematic view of a column attachment mechanism that can be utilized in the exemplary arrangement for attachment of hangers 17 to columns 11 shown in FIG. 13.

For example, as may best be seen from FIGS. 11, 13, and 14, the riser assembly 13 can be attached to an end of a column 11 so that a liquid level is adjacent or at its bottom portion 13b of the riser assembly and a conduit 13c of the riser assembly 13 extends upwardly beyond the liquid level 9a to facilitate a flow of vapor 7a through the column to which the riser assembly 13 is attached so that the vapor flows upwardly beyond the top liquid level 9a and out of the liquid (e.g. for forming of the upper stream 7 to be output from the pressure vessel PV). The bottom portion 13b of the riser assembly 13 can be a riser base plate that is sized and configured for placement at a top end of the column 11 to which it is attached so the bottom portion 13b can function as an end-cap to a top end of the column 11 to which the riser assembly 13 is to be attached. The base plate can have a shape that matches or corresponds to the cross-sectional shape of the column 11 to facilitate attachment to an end of the column 11.

The conduit 13c of the riser assembly can have a top end that is attached to an upper distributor element 13t and is spaced apart from the column 11 to which the riser assembly is attached so that the distributor element 13t is above a liquid level 9a to be provided within the pressure vessel for distillation operations. The bottom portion 13b can be positioned to facilitate a flow of liquid to the liquid level 9a and downwardly through the column 11 to which the riser assembly is attached via openings 130 in a bottom portion 13b of the riser assembly and/or holes 13h in a lower portion of the conduit 13c and the distributor element 13t can be sized and configured for contacting liquid from a feed for distributing the liquid in a flow toward the liquid level 9a and into the column 11 to which the riser assembly 13 is attached and adjacent columns 11.

The columns 11 of the multicolumn assembly 10 arranged in the chamber of the pressure vessel PV can also be supported for positioning in the pressure vessel PV by an array of hangers 17 that are attached within the chamber of the pressure vessel PV and fastened to different columns 11 to provide structural support to the columns 11 and to help maintain the multicolumn assembly 10 of the section S in its pre-selected position within the pressure vessel PV.

Each of the hangers 17 can include an elongated member 17a that can be positioned to extend between opposite sides of the pressure vessel PV within a portion of the chamber of the pressure vessel. The elongated members 17a can be bars, rods, beams, or other type of elongated member for example. The ends of the elongated members 17a can be positioned within the sidewall or sidewalls of the pressure vessel PV at opposite sides of the pressure vessel or can be attached to the opposite sides of the pressure vessel within the chamber, for example.

The elongated members 17a can be attached to a plurality of different spaced apart elongated fastener elements 19 that can each extend downwardly from the elongated member 17a to columns 11 of the multicolumn assembly 10 for attachment to the columns 11. For example, a body 19f of a fastener element 19 can extend below the elongated member 17a to a position within and/or adjacent a clamping member 19c for attachment of the clamping member 19c to the elongated member 17a via the fastener element 19. The clamping member 19c can include a body having a slot 19g that has a downwardly facing opening sized to receive upper walls of adjacent bottom portions of riser assemblies 13 attached to different columns 11 and outer walls 20w of adjacent columns 11 so that the top portions of the outer walls 20w and riser assembly walls are positionable within the slot 19g.

One or more engagement elements 19s (e.g. set screws, friction inducing bolts, etc.) can be positioned through the body of the clamping member so that an engagement end 19e of each engagement element 19s contacts and/or engages the walls 20w of the column 11 and walls 13w of the riser assembly bottom portions 13b. For example, the engagement end 19e of each engagement element can directly contact a wall 13w of a base portion 13b of a riser assembly and engage the other wall 13w of the other riser assembly and walls 20w of the columns 11 via a force exerted via positioning of the engagement element within the body of the clamping member 19c and at least one inner wall of the clamping member 19c that defines the slot 19g positioned opposite the engagement end 19e. The walls 20w of the columns 11 and the walls 13w of the bottom portion 13b of the riser assemblies 13 can be located between the engagement end 19e and opposite portion of the clamping member 19c within the groove 19g after the engagement element 19s is secured and positioned in the clamping member 19c.

Each of the hangers 17 can include a plurality of spaced apart elongated fastener elements 19 that can extend from an elongated member 17a of the hanger 17. Each fastener element 19 can have an upper end portion attached to the elongated member 17a and a bottom portion attached to a clamping member 19c. Each clamping member 19c can utilize one or more engagement elements 19s for having engagement ends 19c positioned within the slot 19g of the clamping member 19c.

The fastener elements 19 can be configured as elongated bolts, anchors, or other type of fastener for attachment of the clamping member 19c to the elongated member 17a. The hangers 17 can be arranged to facilitate suspension of the section S of packing via suspension of the columns 11 of the multicolumn assembly 10. Adjacent walls 20w of adjacent columns 11 can also be attached together (e.g. via welding, different walls 20w being integral with each other, etc.) to facilitate this type of suspension within the chamber of the pressure vessel PV.

The hangers 17 can be arranged so that no other positioning system is utilized to help support positioning of the multicolumn assembly 10 within the chamber of the pressure vessel PV. The annular seal formed via the jigsaw seal elements 15 can also provide help in positioning of the multicolumn assembly in some embodiments. It is contemplated that a pressure vessel PV can also have lower supports positioned below a multicolumn assembly 10 to provide additional support to the multicolumn assembly 10 within the chamber of the pressure vessel PV as well. Other embodiments may not utilize such lower supports and also may not have seal elements 15 positioned in such a way that they may facilitate providing positional support to the multicolumn assembly 10 within the chamber of the pressure vessel PV.

In operation, the seal defined by the seal elements 15 can facilitate forcing the feed into the pressure vessel to be passed through the different columns 11 of the multicolumn assembly. This can help provide improved interactions between liquid and vapor flows passing through the packing (e.g. corrugated layers within the packing units 11a of each column 11) to provide improved separation and distillation processing that can occur more efficiently and effectively. The size and configuration of the columns 11 and column assembly 10 or column assemblies 10 can be selected to meet a pre-selected set of design criteria to take into account the feed to undergo distillation, acceptable pressure drop to be experienced via passing the feed through the pressure vessel, and other design considerations for a particular implementation.

We determined that the design and configuration of packing units 11*a* and columns 11 can be adapted to facilitate improved fabrication of a column assembly 10 for including in a section S of packing to be positioned within a pressure vessel PV. For instance, exemplary embodiments of packing units 11*a*, columns 11, and column assembly 10 fabrication can be configured to facilitate improved fabrication that can permit embodiments of the apparatus for distillation 1 to be installed with improved efficiency and flexibility.

For instance, we have found that by utilization of a pre-selected width or diameter, the packing unit 11*a* manufacturing process can be configured for providing packing units 11*a* to accommodate different sized pressure vessel PV designs. This can result in improved packing manufacturing costs because the speed of the packing line can be increased due to this optimization. This can be further enhanced via automation, which can be adapted due to the ability to use the pre-selected width or diameter for standardization for a particular manufacturing process. This automatability also helps provide improved fabrication flexibility by permitting different manufacturing steps to each be further enhanced as well as improvements in fabrication speed and reductions in operational cost associated with the fabrication.

Figure 6:
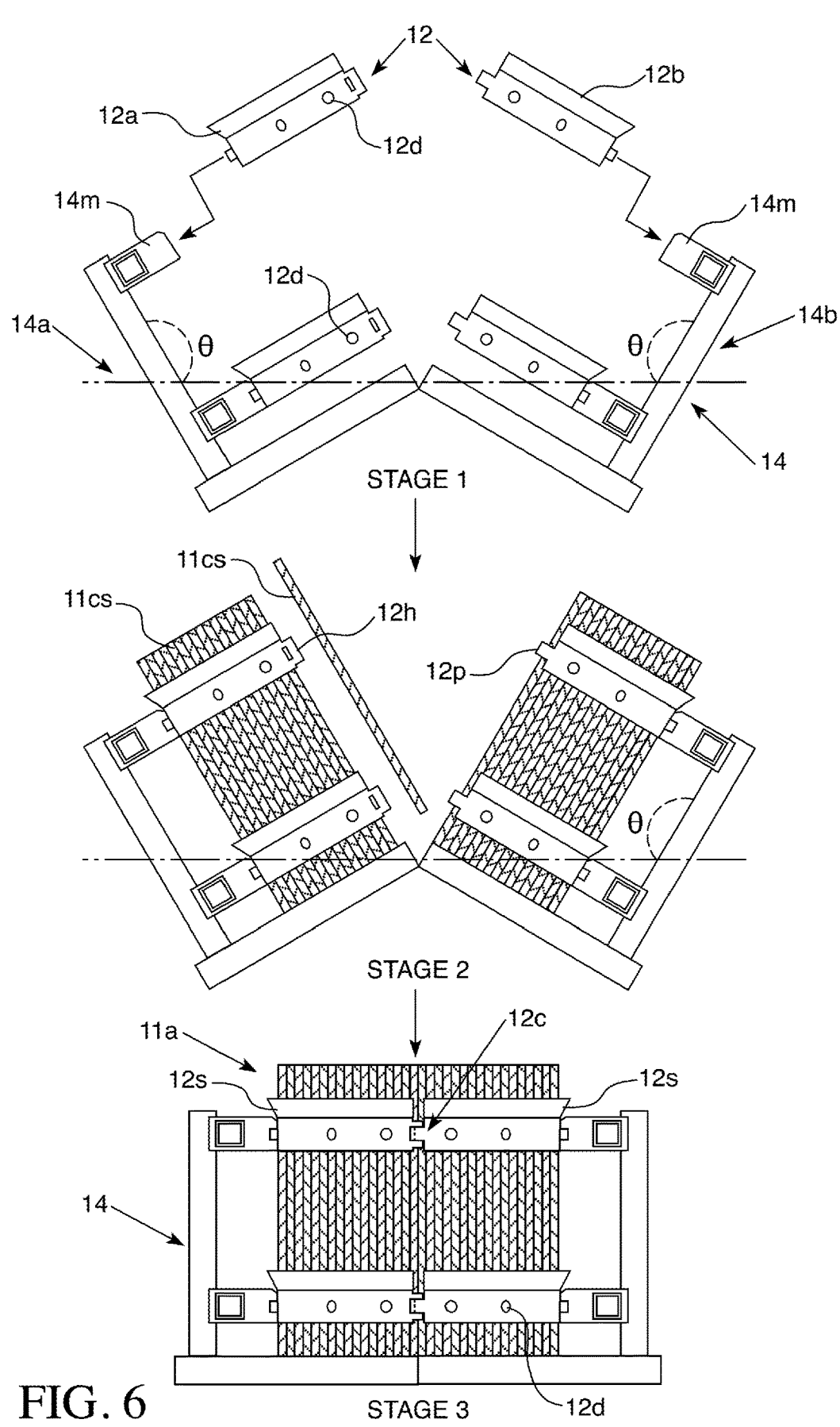
FIG. 6 is a flow diagram illustrating an exemplary process for forming a packing unit 11a that can be utilized in exemplary embodiments of our process for forming multicolumn assemblies 10 and forming apparatuses for distillation 1.
Figure 7:
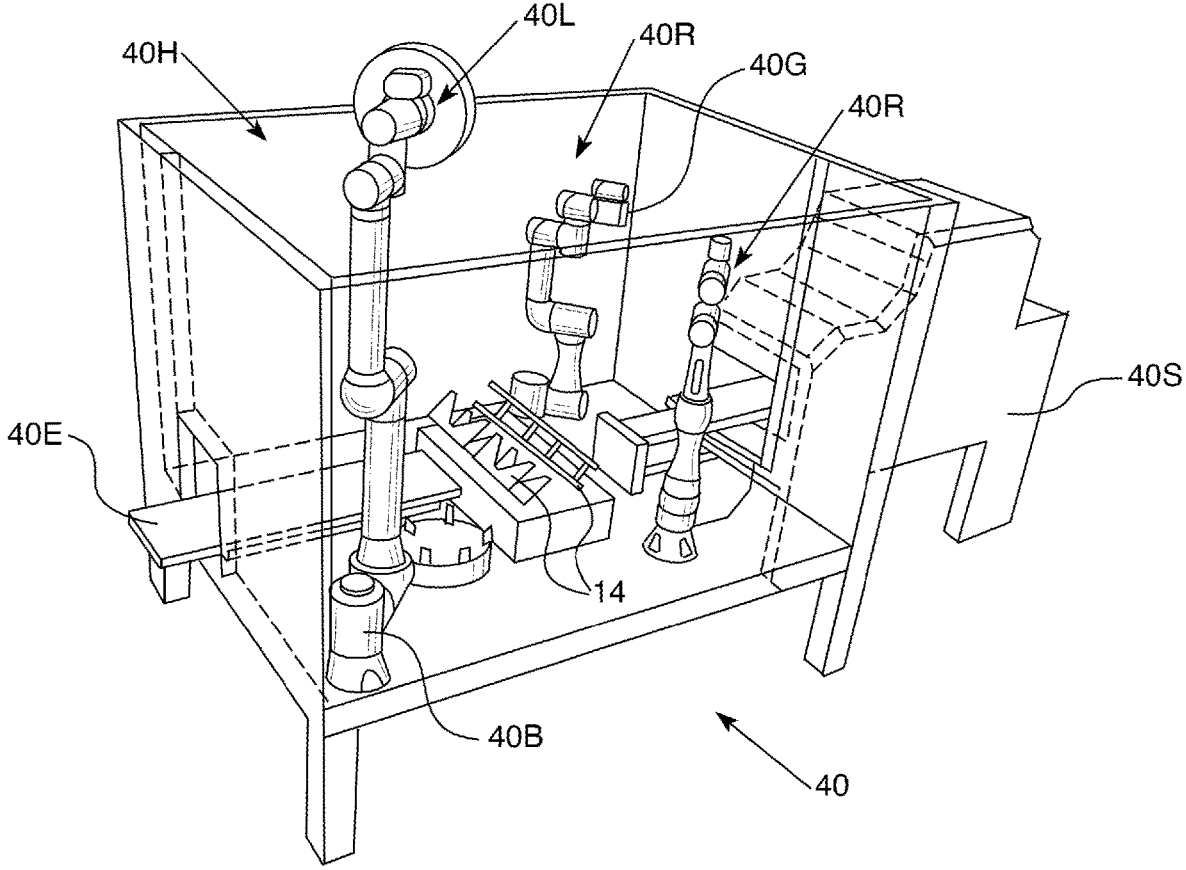
FIG. 7 is a schematic illustration of an automated system 40 for forming packing units 11a that can be utilized in embodiments of the processes shown in FIGS. 6 and 15.
Figure 8:
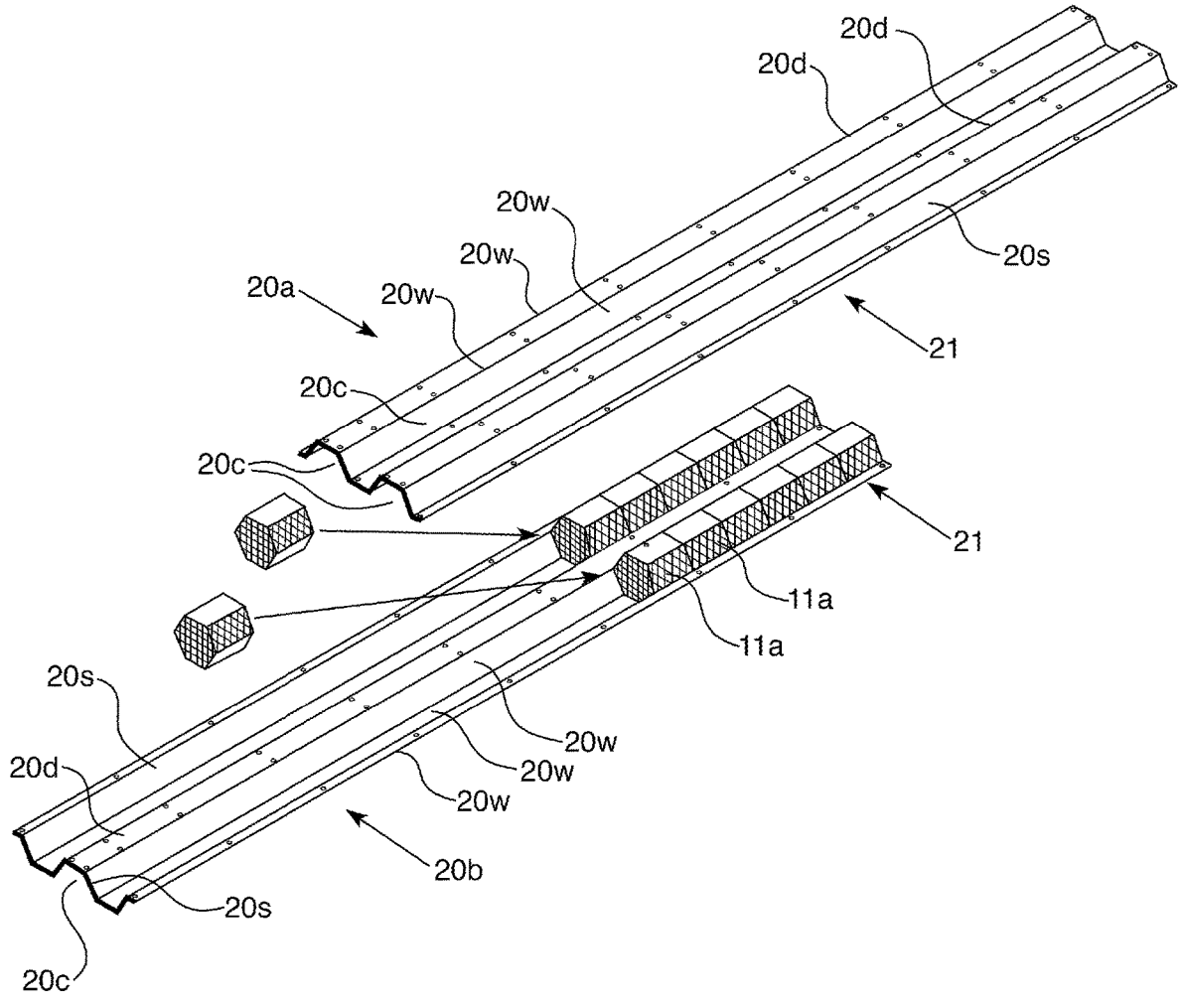
FIG. 8 is an exploded view of an exemplary embodiment of a column assembly process for forming multiple columns to be incorporated into an exemplary embodiment of a multicolumn assembly 10 that can be used in exemplary embodiments of our apparatus for distillation 1.

For example, packing units 11*a* can be designed and configured so they can be formed and manufactured in an automated process that can permit improved manufacturing capacity that can also permit improved flexibility in manufacturing to account for different pressure vessel PV designs and end uses for an apparatus for distillation 1. FIG. 6 illustrates an exemplary process for forming packing units 11*a* and FIG. 7 illustrates an exemplary system that can be utilized to implement this process.

As shown in FIG. 6, packing units 11*a* can be formed via an adjustable cradle 14 that can be adjusted between open and closed positions to facilitate packing element layering and subsequent bundling of the packing elements for forming a packing unit 11*a*. The adjustable cradle 14 can be configured to provide a clam shell assembly process in some embodiments. For example, the cradle 14 can be adapted for connection with a first portion 12*a* of a first banding element 12 and a second portion 12*b* of the first banding element 12 so that movement of the cradle from an open position to a closed position can connect terminal end portions of the first portion 12*a* of the first banding element 12 to terminal end portions of the second portion 12*b* of the first banding element 12 to form the first banding element 12 to encircle the sheets of corrugated material 11*c* to form a packing unit 11*a*.

For example, the cradle 14 can include a first portion 14*a* that is pivotable relative to a second portion 14*b*, which can also be pivotable. The first and second portions 14*a* and 14*b* can be pivotally connected to each other or can be pivotally connected to a support or base to facilitate adjustment of these portions from an open position to a closed position and vice versa. In an open position of the cradle, the first portion 14*a* and second portion 14*b* can each be angled relative to horizontal to provide an angled surface on which corrugated sheets of material 11*cs* can be layered onto the portion for forming the packing of the packing unit 11*a*. The angle relative to horizontal at which the first portion 14*a* and second portion 14*b* can extend for receiving the corrugated sheets of material 11*cs* can be an angle θ of between 15° and 75°, between 30° and 60°, or between 40° and 50° relative to horizontal in some embodiments. For instance, each portion can extend at an angle θ of 45° relative to horizontal when the cradle 14 is in the open position.

When in the open position, the cradle 14 portions can each have banding connectors 14*m* to the cradle portion for receipt and bundling of the corrugated sheets of material 11*cs*. For example, the first portion 14*a* can have at least one banding connector 14*m* that is configured to receive a portion of a banding element 12 and the second portion 14*b* can also have at least one banding connector 14*m* that is configured to receive a portion of a banding element 12 for collection of corrugated sheets of material 11*cs* for formation of layers of packing and subsequent banding of the layers to form the packing unit 11*a*.

Each banding element 12 can be a member that is positionable around a circumference or perimeter of packing elements of the packing unit 11*a* (e.g. layers of corrugated sheets of material 11*cs*). The banding elements 12 can include, for example, metal bands, metal rings, metal annular structures, or other type of banding elements that can be positionable around the layers of corrugated sheets of material 11*cs* of the packing unit 11*a* to keep the layers arranged in a tight positioning for subsequent use of the packing unit 11*a*.

In some embodiments, the banding elements 12 can include first and second portions 12*a* and 12*b* that can be connectable to each other via their terminal ends of the portions to facilitate formation of the banding elements 12. The formed banding elements 12 can be considered wipers in some embodiments.

For instance, first portion 14*a* of the cradle 14 can have a first banding connector 14*m* configured to receive a first portion 12*a* of a first banding element 12. The first portion 12*a* of the first banding element 12 can include a first terminal end and a second terminal end opposite its first terminal end. The terminal ends of the first portion 12*a* of the first banding element 12 can each include connection mechanisms 12*i* for connecting to terminal ends of a second portion 12*b* of a first banding element 12 that can be connected to a second banding connector 14*m* of the second portion 14*b* of the cradle 14. The terminal ends of the second portion 12*b* of the first banding element 12 can also include connection mechanisms 12*i* to facilitate such a connection. A first terminal end portion of the second portion 12*b* of the first banding element 12 can include a connection mechanism 12*i* and the second terminal end portion of the second portion 12*b* of the first banding element 12 can include a connection mechanism 12*i*, for example.

These connection mechanisms 12*i* can include, for example, a slot 12*h* defined in a terminal end portion of a banding element portion and a protrusion 12*p* sized and configured for being inserted through the slot for frictional engagement and connection to the terminal end portion defining the slot 12*h*. In some embodiments, the first portion 12*a* of a banding element 12 can have terminal ends that have the same type of connection mechanism (e.g. slots 12*h* or protrusions 12*p*) and the second portion 12*b* of the banding element can have terminal ends that have the same type of connection mechanism (e.g. slots 12*h* when the first portion 12*a* has protrusions 12*p* or protrusions 12*p* when the first portion 12*a* has slots 12*h*). Alternatively, each banding element portion can have a first terminal end with a first type of connection mechanism 12*i* (e.g. slot 12*h* or protrusion 12*p*) and the second terminal end can have a second type of connection mechanism 12*i* (e.g. protrusion 12*p* when the first end has the slot 12*h* or slot 12*h* when the first end has the protrusion 12*p*).

For facilitating the layering of the corrugated sheets of material 11*cs* for a packing unit 11*a*, the cradle 14 can be arranged and utilized as may best be appreciated from the exemplary embodiment shown in FIG. 6. For instance, in a first section of packing unit 11*a* formation, the cradle 14 can be moved to its open position and the first portion 14*a* of the cradle can have a first portion 12*a* of a first banding element 12 connected to banding connectors 14*m* and the second portion 14*b* of the cradle 14 can have a second portion 12*b* of the first banding element 12 connected to banding connectors 14*m* of the second portion 14*b* of the cradle. This positioning of the first and second portions 12*a* and 12*b* of the first banding element 12 can be provided so that (i) a first terminal end of the first portion 12*a* of the first banding element has a first connection mechanism 12*i* oriented for facing toward a first connection mechanism 12*i* of a first terminal end portion of a second portion 12*b* of the first banding element 12 and (ii) a second terminal end of the first portion 12*a* of the first banding element 12 has a second connection mechanism 12*i* oriented for facing toward a second connection mechanism 12*i* of a second terminal end portion of the second portion 12*b* of the first banding element 12. The positioning can be provided via the banding connectors 14*m* so that when the cradle 14 is subsequently moved to its closed position, the connection mechanisms 12*i* engage each other to connect together so that the first portion 12*a* and second portion 12*b* of the banding element 12 connect to form the annular structure of the banding element 12 around a periphery of the packing unit 11*a* for encircling the layers of corrugated sheets of material 11*cs* positioned onto each portion of the banding element when the cradle 14 was in its open position.

For instance, in a first section of packing unit 11*a* fabrication, the cradle 14 can be moved to its open position and the first portion 12*a* of a first banding element 12 can be attached to first banding connectors 14*m* of the first portion 14*a* of the cradle 14. A second portion 12*b* of a first banding element 12 can also be attached to first banding connectors 14*m* of the second portion 14*a* of the cradle 14. A first portion 12*a* of a second banding element 12 can be attached to second banding connectors 14*m* of the first portion 14*a* of the cradle 14 and a second portion 12*b* of a second banding element 12 can also be attached to second banding connectors 14*m* of the second portion 14*a* of the cradle 14 in situations where a second banding element 12 may be desired. In embodiments that may utilize third or fourth banding elements (or more than four banding elements, etc.), additional banding connectors 14*m* can be provided on each portion of the cradle to facilitate additional banding element positioning as well.

After the first and second portions 12*b* of the one or more banding elements 12 are positioned on the first and second portions of the cradle 14 and connected to the banding connectors 14*m* of those respective portions of the cradle 14, corrugated sheets of material 11*cs* can be positioned on the first portions 12*a* of the one or more banding elements 12 and corrugated sheets of material 11*cs* can also be positioned on the second portions 12*b* of the one or more banding elements 12 in a second section of packing unit 11*a* fabrication.

The positioning and layering of the corrugated sheets of material 11*cs* can be performed to define a pre-selected path flow for the packing unit 11*a*. The pre-selected path flow can be based on a pre-defined path-flow arrangement that is defined by the layers of corrugated sheets of material 11*cs* and how they are oriented during the positioning of the corrugated sheets of material 11*cs* that can occur in the second section of the packing unit fabrication process.

In some embodiments, the layering on each portion 14*a*, 14*b* of the cradle 14 can be performed so that a first corrugated sheet of material 11*cs* is positioned in a first orientation and a second corrugated sheet of material 11*cs* is positioned on the first corrugated sheet of material 11*cs* in a second orientation that differs from the first orientation. A third corrugated sheet of material 11*cs* can then be positioned on the second corrugated sheet of material 11*cs* in a third orientation that differs from the first orientation and also differs from the second orientation or can be placed on the second corrugated sheet of material 11*c* so that the third corrugated sheet of material 11*cs* is in the first orientation (e.g. has an orientation that is the same as the first corrugated sheet of material 11*cs*). Additional corrugated sheets of material 11*cs* can be positioned in a similar fashion to orient each corrugated sheet of material 11*cs* in a desired manner so that when the cradle 14 is closed to form the packing unit, the packing of the various corrugated sheets of material 11*cs* can have a pre-selected orientation and arrangement that provides the pre-defined path-flow arrangement that defines the pre-selected path flow for the packing unit 11*a*.

In some embodiments, the layering of the corrugated sheets of material 11*cs* can be provided so that a first sheet is oriented in the first orientation, a second sheet is positioned on the first sheet in an orientation that is rotated 90° or 180° relative to the first orientation. A third sheet can then be positioned on the second sheet in the first orientation or in another orientation that is rotated 90° relative to the orientation of the second sheet. This type of layering can be repeated in a similar sequence or other sequence to provide the desired pre-selected orientation and arrangement.

In some embodiments, the layering can be performed so that a first sheet and second sheet positioned on the first sheet are oriented 180° relative to each other and the layering is continued so every other corrugated sheet of material 11*cs* has the same orientation within the formed packing unit 11*a* and immediately adjacent corrugated sheets of material 11*cs* have orientations that differ. In some arrangements, a central pair of corrugated sheets of material 11*cs* may have the same orientation while all other immediately adjacent corrugated sheets of material have different orientations. In other orientations, the corrugated sheets of material can be arranged so that all immediately adjacent corrugated sheets of material have different orientations.

The layering of corrugated sheets of material 11*cs* can be performed so that corrugated sheet of material 11*cs* are placed on the first and second portions of banding elements 12 connected to the different portions of the cradle 14. The placing can be performed for orienting the corrugated sheet of material 11*cs* in a similar fashion for each portion 14*a*, 14*b* of the cradle 14.

After the desired number of layers of corrugated sheets of material 11*cs* are positioned on the first portions 12*a* and/or second portions 12*b* of the one or more banding elements 12, the cradle 14 can be moved to a closed position in a third section of packing unit 11*a* fabrication. The one or more first portions 12*a* and one or more second portions 12*b* of the one or more banding elements 12 can be positioned on the cradle portions 14*a* and 14*b* so that when the cradle 14 is moved to its closed positions, the connection mechanisms 12*i* of the terminal end portion of the first portion(s) 12*a* engage with the connection mechanisms 12*i* of the terminal end portions of the second portion(s) 12*b* to form the banding element(s) 12.

The cradle 14 can be adjusted from its open position to its closed position such that a pre-selected amount of closing force is applied for the closing of the cradle 14 for engagement of the connection mechanisms 12*i* of the terminal end portion of the first portion(s) 12*a* with the connection mechanisms 12*i* of the terminal end portions of the second portion(s) 12*b* to form the banding element(s) 12. The pre-selected closing force can be a pre-defined force that is sufficient for causing this engagement to occur so that the banding element 12 is formed via the closing of the cradle 14. After the forming the banding element(s) 12, each banding element 12 can have a tab 12*c* that projects for contact within an inner wall of the pressure vessel PV and/or adjacent packing unit 11*a*.

Each portion of the cradle 14 can include one or more guides that can facilitate the delivery of this pre-selected closing force. The guides can be integrated into the banding connectors 14*m* for each cradle portion and/or be attached to the banding connectors 14*m*, for example. Controls can also be utilized to measure the force that is applied so that the closing force can be increased as needed to provide the pre-selected closing force during closing of the cradle 14 to help ensure the engagement of the connection mechanisms 12*i* of the terminal end portion of the first portion(s) 12*a* with the connection mechanisms 12*i* of the terminal end portions of the second portion(s) 12*b* to form the banding element(s) 12 during closing of the cradle 14.

For example, during the closing of the cradle 14, the first terminal end of the first portion 12*a* of the first banding element's first connection mechanism 12*i* can engage with a first connection mechanism 12*i* of a first terminal end portion of a second portion 12*b* of the first banding element 12 for attachment of these terminal end portions of the first and second portion 12*a* and 12*b* of the first banding element and (ii) the second connection mechanism 12*i* of the second terminal end of the first portion 12*a* of the first banding element 12 can engage the second connection mechanism 12*i* of the second terminal end portion of the second portion 12*b* of the first banding element 12 for attachment of these terminal end portions of the first and second portions 12*a* and 12*b* of the first banding element 12. In such engagement, the protrusions 12*p* can be inserted into corresponding slots 12*h* for attachment of the terminal end portions, for example. The insertion can occur such that the attachment between the corresponding connection mechanisms 12*i* is secured and the one or more banding elements 12 are formed at the time the cradle 14 is closed so that the formed banding element(s) 12 encircle the layers of corrugated sheets of material 11*cs* and maintain these layers in a tight arrangement to provide the pre-defined path-flow arrangement defined by the placement of the layers of corrugated sheets of material 11*cs* performed during the second section of packing unit fabrication. For instance, the protrusions 12*p* can be sized and configured for insertion into the slots 12*h* so that the protrusions can be inserted through the slots 12*h* and are unable to be removed from the slots after being inserted through the slots 12*h* without fracturing the portion of the formed banding element 12 that defines the slot 12*h*.

The banding elements 12 that are formed can include pre-defined protuberances 12*d*. The first portion 12*a* and the second portion 12*b* of each banding element can have a number of protuberances 12*d* defined on an outer side of the body of that portion adjacent terminal ends of the portion, for example. These protuberances 12*d* can be sized and configured as spacers to facilitate positioning of the packing units 11 within the columns.

The protuberances 12*d* can be sized and configured to help maintain a pre-selected spacing between the packing elements and the inside wall 20*w* of the column so that seal elements 12*s* and tabs 12*c* of the banding elements 12 can be positioned to contact with the wall(s) 20*w* of the column to facilitate liquid flowing off the wall and back into the packing elements and to block vapor flow from by-passing through a gap between the packing unit 11*a* and the inner wall of the column to force vapor to flow through the packing elements of the packing unit 11*a*. The protuberances 12*d* and tabs 12*c* can help incorporate the function of maintaining the gap dimension to the pre-selected gap dimension for effective sealing to be provided by the seal elements 12*s* and can also avoid use of separate spacers or other parts to allow fabrication of a packing unit 11*a* to be easier to automate.

The banding elements 12 can also include seal elements 12*s*. The seal elements 12*s* can include one or more resilient fingers or resilient members that extend from at least one side (e.g. a top side or a bottom side) of the first portion 12*a* and second portion 12*b* of the banding element. In some configurations, the seal elements 12*s* can extend adjacent formed tabs 12*c* so that the tabs 12*c* and seal elements 12*s* can provide sealing as discussed above.

The seal elements 12*s* can be defined so that once the banding element 12 is formed, the seal elements 12*s* are positioned to engage an inner side of walls 20*w* of a column 11 to help force fluid (e.g. liquid and vapor) to flow through the packing (e.g. corrugated sheets of material 11*cs*) of the packing unit 11*a* and not pass outside of the packing unit 11*a* between a wall 20*w* of a column 11 and the packing unit 11*a*. The seal elements 12*s* can also help facilitate positioning of the packing unit 11*a* within a column 11 for tight engagement therein.

The seal elements 12*s* can extend between tabs 12*c* formed in the banding element 12 during banding element formation via closing of the cradle 14 so that the tabs 12*c* and seal elements 12*s* can provide sealing. Other configurations can utilize one or more seal elements 12*s* to provide sealing along an entire periphery of the banding element 12.

It is contemplated that after the cradle 14 is moved to its closed position for forming the one or more banding elements 12 and the packing unit 11*a* in the third section of fabrication for the packing unit 11*a*, the terminal ends of the first and second portions 12*a* and 12*b* of the banding element(s) 12 can be connected via one or more other connection mechanisms to supplement the connection mechanisms 12*i* of the banding element portions. For instance welding, use of fasteners, or other connection mechanisms can be utilized to hep supplement the connection mechanisms 12*i* of the banding element portions. In other embodiments, just the connection mechanisms 12*i* may be utilized for formation of the packing units 11*a* and forming of the banding elements 12 via the closing of the cradle 14.

The packing unit fabrication process can be automated via a packing unit fabrication system 40. An exemplary embodiment of such a system is illustrated in FIG. 7. The packing unit fabrication system 40 can include a corrugated sheet shearing unit 40S that is configured to cut a corrugated sheets of material into desired lengths or widths to form corrugated sheets of material 11*cs*. The system can also include one or more robotic arms 40R that each include at least one gripping element 40G for gripping a corrugated sheet of material 11*cs* after it has been cut via the shearing unit 40S for placing on a first portion 14*a* or second portion 14*b* of a cradle and/or placing on a first portion 12*a* or second portion 12*b* of a banding element 12 after that has been attached to a respective portion of the cradle 14. The system can also include at least one cradle 14 positioned adjacent the one or more robotic arms 40R for receipt of corrugated sheets of material 11*cs* and being adjusted between open and closed positions. Such adjustment of the cradle positions can be automated via use of one or more actuators connected to the cradles to drive motion of the first and/or second portions 14*a* and 14*b* of the cradle 14 for adjusting the cradle between its open and closed positions.

The system 40 can utilize a single cradle 14 or multiple cradles 14 to facilitate a desired speed of layering of corrugated sheets of material 11*cs* and forming of packing units 11*a*.

The system 40 can also include a locating robot 40L that can include a moveable arm configured to move a formed packing unit 11*a* from the cradle 14 when the cradle is in its closed position for positioning on conveyer belt 40E or other location for storage and/or transport of the formed packing unit 11*a* to a desired location for subsequent use. The locating robot 40L can include a base 40B that can be pivotable as well as an articulated arm for manipulation and moving of the formed packing units 11*a*.

The system 40 can also include a housing 40H that can be positioned to enclose or at least partially enclose portions of the system. For example, the housing 40H can include walls positioned to enclose the robot arms 40R and locating robot 40L to help provide some protection to those elements as they operate.

The movement of the robot arms 40R, locating robot 40L, and/or other elements of the system can be controlled via one or more controllers so that their operation is fully automated. The controller can control operation based on a control feedback loop that is informed via one or more sensors positioned in the system (e.g. attached to the robot arms 40R, locating robot 40L, housing 40H, or otherwise positioned for providing data to the controller). The controller can be configured to control operations so that the packing unit 11*a* fabrication process is fully automated or at least semi-automated. An operator can utilize a computer device (e.g. smart phone, laptop computer, desktop computer, etc.) to communicate with the controller via at least one input device and/or output device for adjusting controller setpoints or operational modes of the controller.

After the packing units 11*a* are made in a sufficient number to provide sufficient packing units 11*a* for formation of columns 11 for a multicolumn assembly 10 of a pressure vessel PV, the columns 11 can be fabricated for forming a multicolumn assembly 10 for installing in a pressure vessel PV. A system for formation of columns and a multicolumn assembly 10 may best be appreciated from FIGS. 8-10 and 12.

For example, sheet of material (e.g. metal, steel, aluminum, a suitable alloy, etc.) can be corrugated via a column corrugation system 30 to form corrugated column assembly sheets 21 for formation of column bodies 20. The column corrugation system 30 can include a coil of metal holder 32 that is positioned to connect a sheet of metal of the coil held by the holder 32 for feeding to a roll forming machine 34 configured to corrugate the metal of the coil to form a corrugated column assembly sheet 21. The column corrugation system 30 can also include a sheet cutting mechanism 36 connected to the roll forming machine 34 so that the rolled metal that is corrugated via the roll forming machine 34 can be cut to a desired length to form a corrugated column assembly sheet 21.

The sheet cutting mechanism 36 can also be configured to cut the rolled metal that is corrugated to a desired width. For example, the sheeting cutting mechanism can include a slit mechanism that can slit the corrugated column assembly sheet along its length to make narrower sheets. In other embodiments, a slitter can be provided as a separate mechanism downstream of the sheet cutting mechanism 36 for slitting the corrugated column assembly sheets 21 to provide narrower sheets when such narrower sheets may be desired.

The corrugated column assembly sheets 21 can be corrugated to define a plurality of walls 20*w* that define channels 20*c* sized and configured to receive packing units 11*a* therein for formation of columns 11. The defined channels 20*c* can define a channel of a column 11 to be formed after packing units 11*a* are positioned in the channels 20*c* for formation of the columns 11.

The walls 20*w* that are formed via the roll form machine 34 can include flat walls 20*d* that extend linearly in a horizontal direction along a length of the sheet and angled walls 20*s* that can extend form opposite sides of the flat walls 20*d*. The walls 20*w* can be formed so that each flat wall 20*d* can extend from a first end to a second end horizontally and a first side of the flat wall 20*d* can have a first angled wall 20*s* that extends along an angle relative to horizontal from the first side of the flat wall 20*d* and a second angled wall 20*s* that extends along an angle relative to horizontal from the second side of the flat wall 20*d* that is opposite its first side. In some embodiments, some angled walls 20*s* can extend between different flat walls 20*d* such that immediately adjacent spaced apart flat walls 20*d* can be located at different vertical positions that are higher or lower than their immediately adjacent other flat wall(s) 20*d*.

The corrugated column assembly sheets 21 can be provided so that a pair of such corrugated column assembly sheets 21 can be used to form a plurality of columns 11. For example, as may best be appreciated from FIG. 8, a base corrugated column assembly sheet 20*b* can be positioned so that the flat walls 20*d* are oriented horizontally and positioned to receive a plurality of packing units 11*a*. The plurality of packing units 11*a* can be aligned and positioned next to each other to form a column 11 by being placed on a flat wall 20*d* for each flat wall 20*d* that is present in the base corrugated column assembly sheet 20*b*. The packing units 11*a* can be sized and configured so that the outer sides of the packing units include a bottom side that is in contact with the flat wall 20*d*, a first side that is in contact with a first angled wall 20*s* that extends from the first flat wall 20*d*, and a second side that is in contact with the second angled wall 20*s* that extends from the second side of the first flat wall 20*d*. An upper side and upper angled portions of the first and second sides of the packing unit 11*a* can be positioned for contact and/or engagement with angled walls 20*s* and a flat wall 20*d* of a corresponding top corrugated column assembly sheet 20*a* to be positioned on the packing units 11*a* after all the packing units 11*a* for the columns 11 to be formed via the pair of corrugated column assembly sheets 21 are arranged. After each column 11 is formed by having the packing units 11*a* aligned next to each other along the length of the flat wall 20*d* for each flat wall 20*d*, the top corrugated column assembly sheet 20*a* can be positioned over the base corrugated column assembly sheet 20*b* for contact with that sheet for sandwiching the packing units 11*a* between the top and base corrugated column assembly sheets 20*a* and 20*b*. After the top corrugated column assembly sheet 20*a* is positioned, an upper flat wall 20*d* of this sheet can contact an upper side of each packing unit 11*a* and angled side walls 20*s* that extend from opposite sides of the flat wall 20*d* can contact corresponding upper angled sides of the packing units 11*a* so that the packing units 11*a* are tightly engaged by the base and top corrugated column assembly sheet 20*b*, 20*a* for forming the columns 11 and the packing units 11*a* of the column 11 are within a channel 20*c* of the column defined by the walls 20*w* of the base and top corrugated column assembly sheets 20*b*, 20*a*. After the top corrugated column assembly sheet 20*a* is suitably positioned and/or during positioning of the top corrugated column assembly sheet 20*a*, the top corrugated column assembly sheet 20*a* can be welded or otherwise fastened to the base corrugated column assembly sheet 20*b* to form the columns 11 for a segment 20 of columns 11 for inclusion in an assembly 24 of columns 11 for forming a multicolumn assembly 10.

In some embodiments, the different corrugated sheets 11*cs* utilized to form the columns 11 can be riveted together to help form the columns and interconnect different corrugated sheets. In some embodiments, pre-punched rivet holes can be formed in the sheet of material prior to corrugation or after corrugated sheets 11*cs* are formed. A perforating unit can be positioned to punch such holes in the manufacturing assembly process for such embodiments. The perforating unit can be positioned before corrugation or after corrugation. As another alternative, it is contemplated that a coil of material to be corrugated can be uncoiled for perforation and subsequently recoiled for being positioned for feeding through a corrugation device (e.g. the recoiled perforated material can be positioned on holder 32 that is positioned to connect a sheet of perforated material of the coil held by the holder 32 for feeding to a roll forming machine 34 configured to corrugate the material of the coil to form a corrugated column assembly sheet 21 having rivet perforations defined therein).

Each segment 20 of columns 11 can be formed such that the one or more banding elements 12 of the packing units 11*a* in each column 11 can be positioned between the walls 20*w* of the column 11 that define the channel 20*c* in which those packing units 11*a* are positioned. The seal elements 12*s* of the banding elements 12 can engage those walls 20*w* as well. The protuberances 20*d* of the banding elements 12 can also help provide spacing between the packing units 11*a* and the walls 20*w* for positioning of the packing units within the channel 20*c* of the column 11. All the columns 11 of the formed multicolumn assembly 10 can have such an arrangement of packing units 11*a* within their channels defined by the walls 20*w*.

Also (or alternatively), welding or other attachment can be provided to seal a top of the section S after installation of the liquid distributor bottoms 13*b*, and on the side edges of the packing units 11*a* which are adjacent to the inner walls 20*w* of columns. The remainder of the sealing between packing units 11*a* can be done using rivets or other attachment mechanisms.

Figure 9:
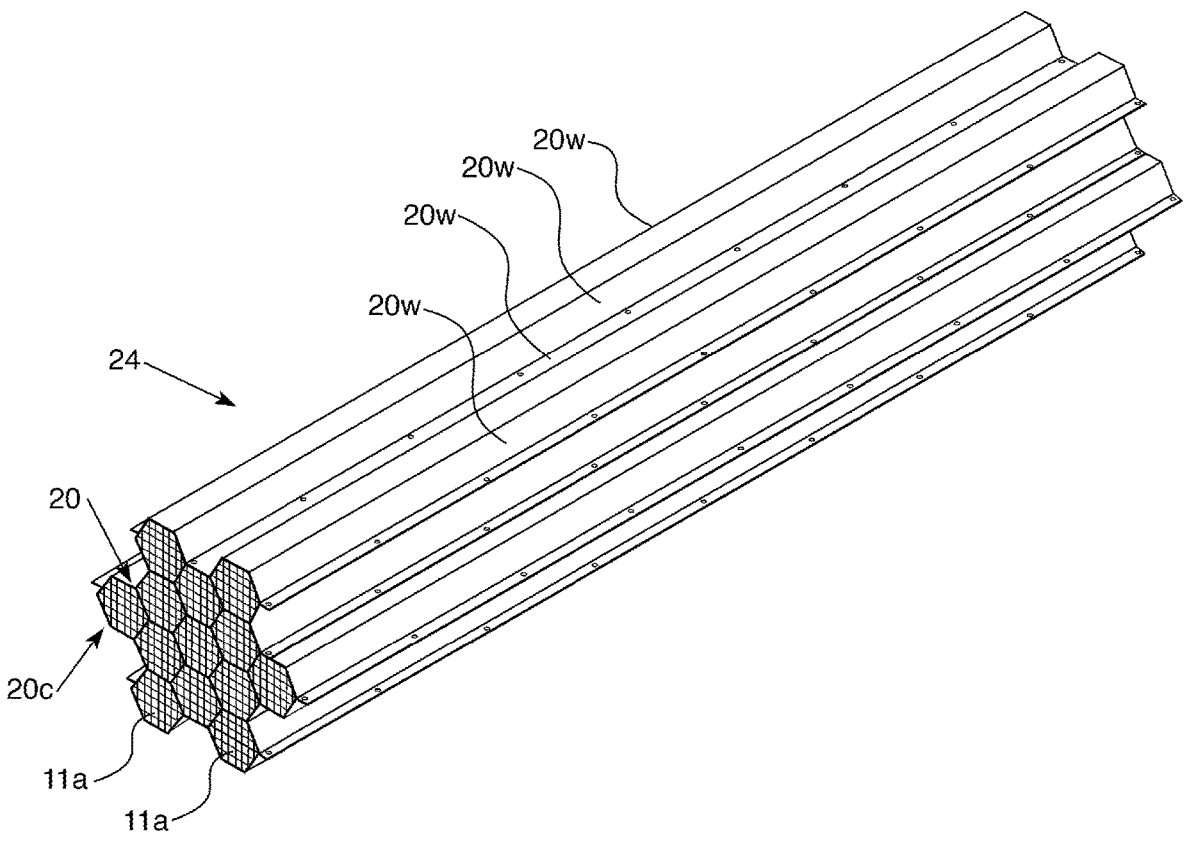
FIG. 9 is a perspective view of a portion of an exemplary multicolumn assembly 10 that can be formed via formation and arrangement of multiple column assembly units 20.
Figure 10:
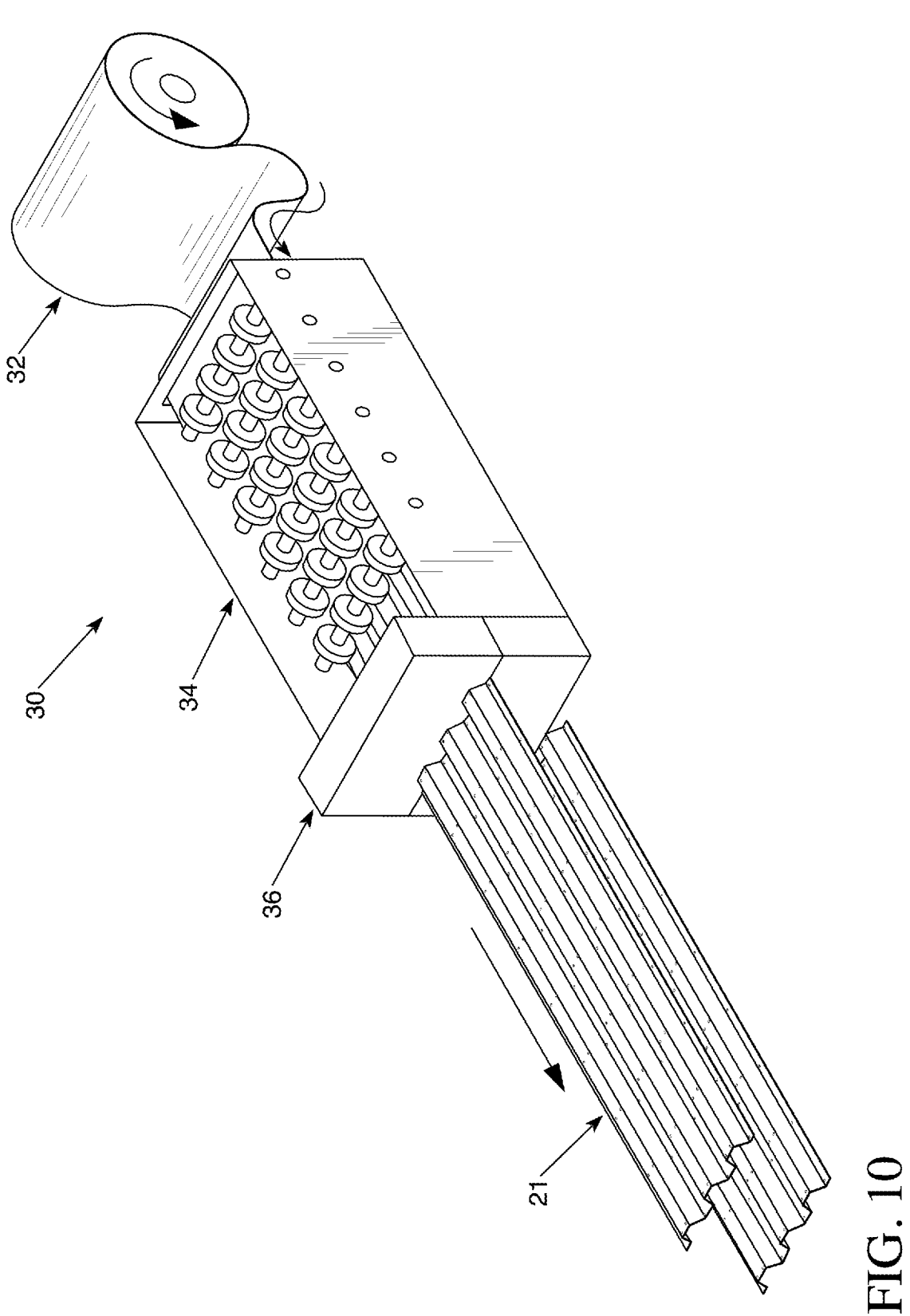
FIG. 10 is a schematic illustration of an exemplary fabrication system 30 for forming exemplary embodiments of corrugated column assembly sheets 21.

Multiple pairs of base and top corrugated column assembly sheets 20*b*, 20*a* can be utilized in conjunction with layering of packing units 11*a* to form an arrangement of columns 24 as may best be appreciated from FIGS. 9 and 12. As may be seen in FIG. 12, the columns 11 formed via the corrugated column assembly sheets 21 and packing units 11*a* can be arranged on bottom supports 22 that are spaced apart and positioned to hold the columns 11 during formation of the multicolumn assembly 10. Each bottom support can have a shaped opening to facilitate holding of the assembly 24 of columns 11 for forming the multicolumn assembly 10 in a desired pattern or shape for inclusion in the chamber of the pressure vessel PV. As may best be seen from FIGS. 3, 9, and 12, the assembly 24 of columns 11 for forming the multicolumn assembly 10 can be performed so that the columns 11 of the multicolumn assembly 10 for a section S of packing are in a honeycomb arrangement to facilitate forming the desired shape and pattern of the multicolumn assembly 10 for being positioned as a section S of packing in a chamber of the pressure vessel PV.

In some embodiments, it is contemplated that the placing of packing units 11*a* onto bottom supports 22 can be automated via robots (e.g. one or more robotic arms) picking up the packing units 11*a* and placing them in the assembly. This automation can help further speed the process of forming the multi-column assembly 10.

Figure 4:
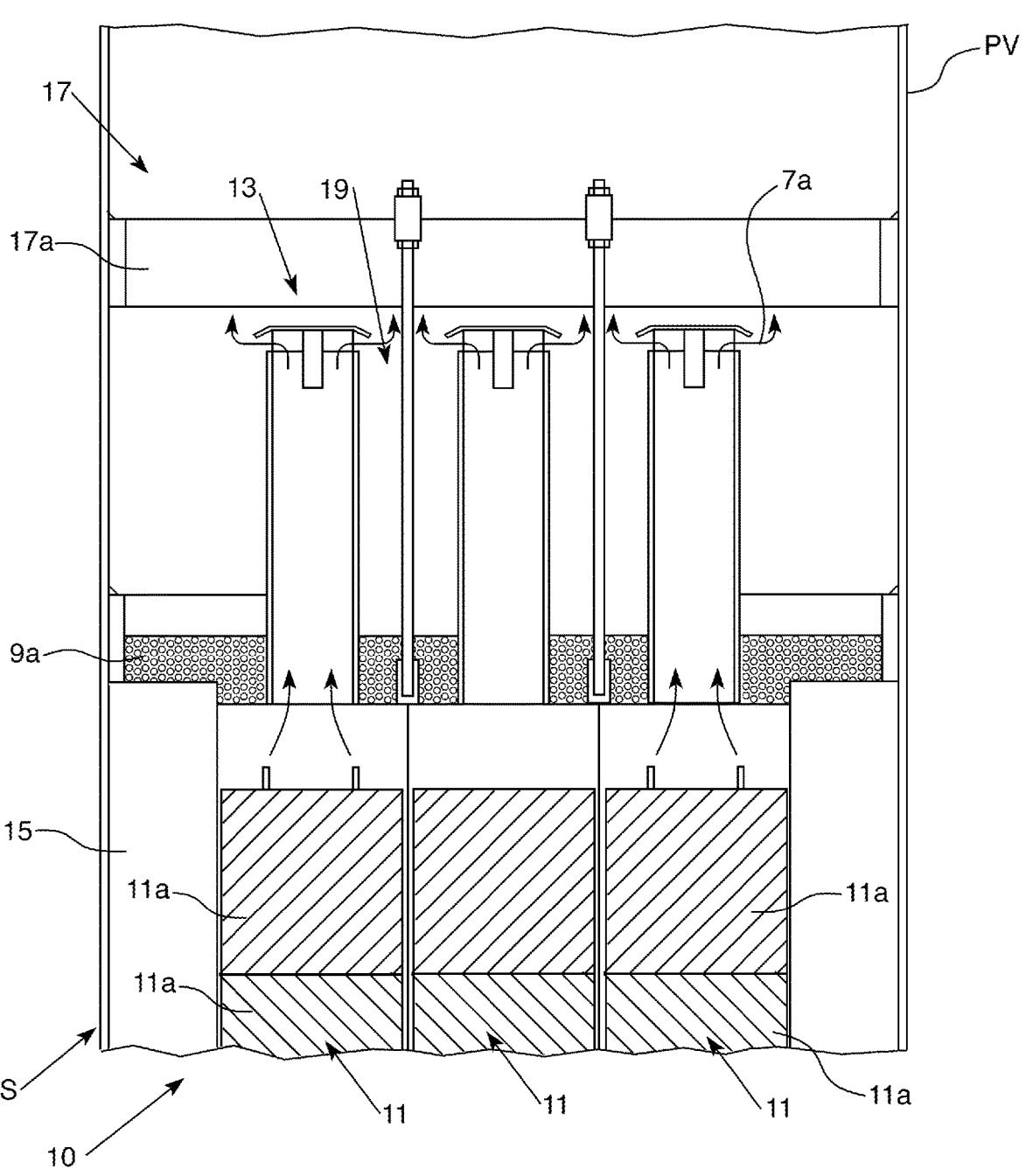
FIG. 4 is a schematic illustration of an exemplary embodiment of our apparatus for distillation to illustrate an exemplary vapor flow and liquid flow profile that can exist via the different columns 11 of the multicolumn assembly 10 of a section S.
Figure 5:
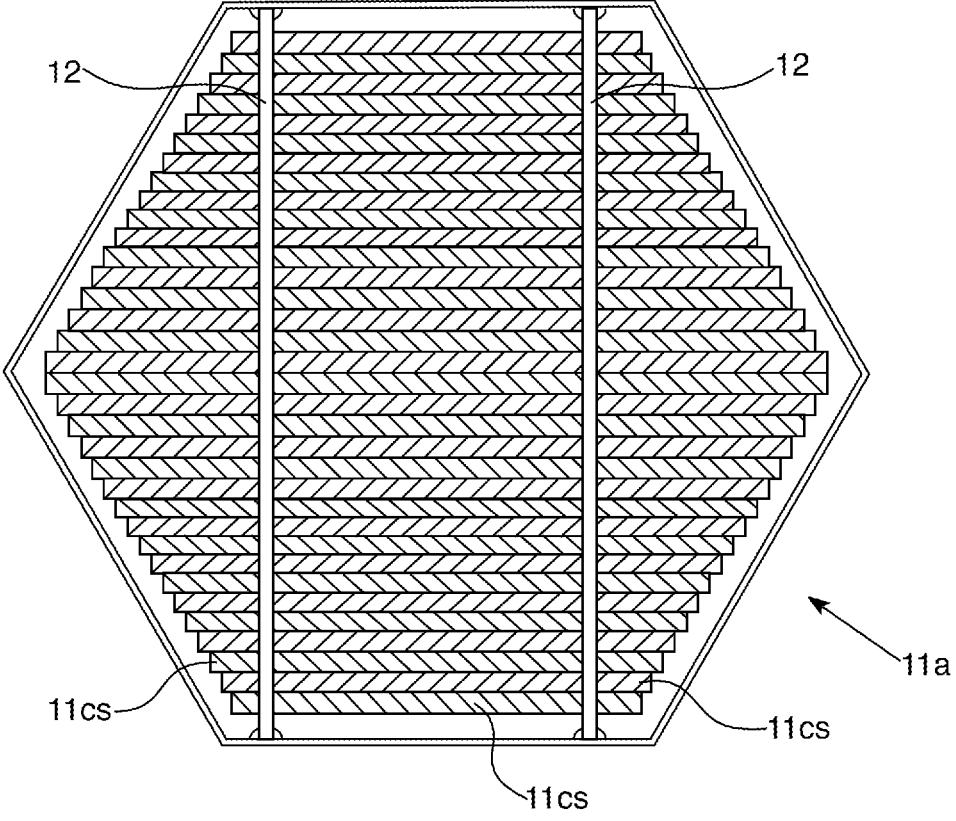
FIG. 5 is a schematic bottom view of an exemplary embodiment of a packing unit 11a of a column 11 that can be utilized in embodiments of our apparatus for distillation 1.

As may best be appreciated from FIGS. 4, 11, and 12, during the fabrication process, each formed column 11 can have a riser assembly 13 attached to an upper end of that column 11. As discussed above, for example, the base portion, or bottom portion 13*b* of each rise assembly can be positioned in an upper end portion of a column 11 between a base and top corrugated column assembly sheet 20*b*, 20*a* used to form the column to which that riser assembly is connected. Walls 13*w* of the riser assembly bottom portion 13*b* can be positioned in a distal end portion of the column 11 that is to be that column's upper end for attachment to the walls 20*w* of the base and top corrugated column assembly sheet 20*b*, 20*a* for attachment to the column 11 via an interference fit between the walls 13*w* and walls 20*w*, for example. Welding and/or fasteners can also be utilized to facilitate the connection of the riser assembly 13 to the column 11.

Also, during the forming of the multicolumn assembly 10 for a section, different corrugated column assembly sheets 21 can be welded, riveted, and/or otherwise attached to each other so that the formed honeycomb structure of the multicolumn assembly 10 can be fastened together. Such fastening can help permit all the different columns 11 to be interconnected via the corrugated column assembly sheets 21 attachments to other corrugated column assembly sheets in the multicolumn assembly 10. This type of connection can help provide support for the multicolumn assembly 10 and the hanging or positioning of the multicolumn assembly 10 within the chamber of the pressure vessel via the hangers 17.

After a multicolumn assembly 10 for a section S is fully formed to meet a pre-selected honeycomb patterned structure and the riser assemblies 13 are attached to the columns 11, the multicolumn assembly 10 can be positioned within a pressure vessel PV for being positioned therein for a section S of packing for the pressure vessel PV. The hangers 17 can be positioned in the pressure vessel for attachment of the multicolumn assembly 10 to the hangers 17 for positioning of the multicolumn assembly 10 in the pressure vessel at a desired location within the chamber of the pressure vessel PV, for example.

The interconnection of the hangers 17 and columns 11 of the multicolumn assembly 10 can include positioning of multiple fastener elements 19 to extend from different elongated members 17*a* of different hangers 17 positioned in the chamber of the pressure vessel PV and positioning of clamping members 19*c* for attachment between multiple riser assemblies 13 and columns 11 as discussed above. The clamping members 19*c* can be connected to lower distal ends of the fastener elements 19 and upper ends of the fastener elements 19 can be connected to different elongated members 17*a* at spaced apart locations, for example. The clamping members 19c can then be attached to different riser assemblies 13b and walls 20w of columns 11 as discussed above.

In other situations, the clamping members 29c can be connected to the walls 20w and 13b first. The fastener elements 19 can then be connected to the clamping members 19c. Then opposite ends of the fastener elements 19 can be connected to the elongated members 17a of the hangers 17. In other embodiments, the order of attachment of different elements may vary for positioning of the multicolumn assembly 10 within a chamber of a pressure vessel PV for forming the apparatus for distillation 1.

After the multicolumn assembly 10 is positioned within the chamber, the jigsaw seal elements 15 can be positioned between the periphery of the multicolumn assembly 10 and an inner wall of the pressure vessel or inner side of a wall of the pressure vessel PV to form an annular seal around the multicolumn assembly 10. The positioning of the jigsaw seal elements 15 can occur such that those elements are welded or otherwise attached to the pressure vessel and/or multi-column assembly for positioning of those elements. This positioning can occur prior to the multicolumn assembly 10 being attached to the hangers 17 or after the multicolumn assembly 10 is attached to the hangers 17.

FIG. 15 illustrates an exemplary process for fabrication and/or use of an apparatus for distillation 1. As can be seen from FIG. 15, the process can include providing the packing units 11a and the corrugated assembly sheets 21. For example, the packing units 11a can be formed and the corrugated column assembly sheets 21 can be formed for forming the columns 11 to arrange within a pressure vessel PV in a first step S1. In some embodiments, it is contem-plated that the corrugated assembly sheets 21 can be obtained by a third party manufacturer who can provide corrugated assembly sheets 21 in accordance with design details provided to the manufacturer. The packing units 11a can also be obtained by a third party manufacturer who may be provided design details and/or other instructions for formation of the packing units 11a for the providing of the packing units 11a as well.

In a second step S2, the packing units 11a can be positioned within channels 20c of the column assembly sheets 21 for forming the columns 11. In a third step S3, column assembly sheets 21 can be attached together after columns 11 can be formed for forming the multicolumn assembly 10 for a section S of packing for positioning within a chamber of the pressure vessel PV. In a fourth step S4, riser assemblies 13 or other type of liquid distributors can be positioned on top portions of the columns 11. In a fifth step S5, jigsaw seal elements 15 can be positioned around a periphery of the column assembly 10 so that the seal elements 15 are positioned between an inner wall of the pressure vessel PV and the outer periphery of the column assembly 10. In a sixth step S6, adjacent column assembly sheets 21 can be connected to hangers 17 to support the columns 11 and multicolumn assembly in its desired loca-tion within the pressure vessel PV. This can facilitate secure positioning of the multicolumn assembly 10 for a section S of packing within the pressure vessel PV.

In some embodiments, a pre-distribution mechanism can be positioned in the pressure vessel PV to be located above the multicolumn assembly 10 for a section S. This pre-distribution mechanism can be provided to help introduce liquid in a substantially uniform manner across the width or diameter of the pressure vessel PV above the multicolumn assembly 10 for the section S.

After the apparatus for distillation 1 is formed. It can be installed at a site for use in distillation operations in an optional seventh step S7. The apparatus for distillation 1 can be installed for use such that liquid and vapor can be passed through the columns 11 of the multicolumn assembly 10 for separation of a volatile fraction from a less volatile fraction. The volatile fraction can be separated such that it is output from the pressure vessel PV as upper stream 7 and the less volatile fraction can be passed out of the pressure vessel PV as a lower stream 9. The separation processing can occur so that the feed fed to the pressure vessel passes through the different columns 11 positioned within the pressure vessel PV so that vapor fed to the pressure vessel PV is separated into various portions so the different portions all pass upwardly through different columns 11 and liquid fed into the pressure vessel PV is split into different portions and passed downwardly through the pressure vessel PV so that the different portions of the liquid pass through different columns 11. The flow of the liquid can occur in a counter-current direction as compared to the flow direction of the vapor so that the vapor passing through the columns passes in counter-current direction as compared to the liquid (e.g. the vapor can pass upwardly while the liquid can pass downwardly). The passage of the fluid through the packing of the columns provided by the packing units 11a and the corrugated sheets of material 11cs of those packing units 11a can facilitate heat and mass transfer interactions between the fluids to facilitate separation for formation of the upper stream 7 and lower stream 9. The annular seal provided by the positioned seal elements 15 between the pressure vessel wall and the multicolumn assembly 10 and the positioning of the seal elements 12s and/or tabs 12c of the banding elements 12 of the packing units 11a within the columns 11 for engaging walls 20w of the columns 11 can help facilitate the flow of fluid through the columns 11 to help ensure the fluid passes through the packing of the corrugated sheets of material 11cs for improved heat and mass transfer interac-tions for the separation process for forming of the upper stream 7 and lower stream 9.

It should be appreciated that modifications to the embodi-ments explicitly shown and discussed herein can be made to meet a particular set of design objectives or a particular set of design criteria. For instance, the arrangement and con-figuration of packing units 11a and/or one or more sections S can vary to account for different design configurations and other design criteria. As another example, the size and configuration of the pressure vessel PV can be adapted to meet a particular set of design criteria.

Embodiments of the distillation apparatuses, processes for distillation column fabrication, and distillation column fab-rication systems, can each be configured to include process control elements positioned and configured to monitor and control operations (e.g., sensors, force sensors, level sensors, detectors, an automated process control system having at least one work station that includes a processor, non-tran-sitory memory and at least one transceiver for communica-tions with the sensor elements, and controllers for providing a user interface for an automated process control system that may be run at the work station and/or another computer device of the plant, etc.). It should be appreciated that embodiments can utilize a distributed control system (DCS) for implementation of one or more processes and/or con-trolling operations of an apparatus for distillation column fabrication and/or distillation column fabrication process as well.

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of the process, apparatus, system and methods of making and using the same have been shown and described above, it is to be distinctly understood that the invention is not limited thereto but may be otherwise variously embodied and practiced within the scope of the following claims.

What is claimed is:

1. A process for fabrication and/or use of an apparatus for distillation, the process comprising:

providing a plurality of packing units, each of the packing units having a plurality of corrugated sheets of material encircled by at least one banding element;

providing a plurality of column assembly sheets, each of the column assembly sheets being corrugated to have a plurality of flat walls and a plurality of angled walls, each of the flat walls extending from a first end to a second end, each of the flat walls having a first side and a second side opposite the first side between the first end and the second end, the plurality of flat walls comprising a first flat wall and the plurality of angled walls including a first angled wall extending from the first side of the first flat wall and a second angled wall extending from the second side of the first flat wall;

positioning the packing units in channels of a first column assembly sheet of the plurality of column assembly sheets and attaching a second column assembly sheet to the first column assembly sheet to enclose the packing units and form columns for forming a multicolumn assembly.

2. The process of claim 1, comprising:

attaching a riser assembly to an end portion of each of the columns.

3. The process of claim 2, comprising:

positioning the multicolumn assembly within a chamber of a pressure vessel.

4. The process of claim 3, comprising:

positioning jigsaw seal elements within the chamber between at least one wall of the pressure vessel and the multicolumn assembly to define an annular seal between the pressure vessel and the multicolumn assembly.

5. The process of claim 4, comprising:

connecting the multicolumn assembly to hangers positioned in the chamber.

6. The process of claim 3, comprising:

connecting the multicolumn assembly to hangers positioned in the chamber.

7. The process of claim 3, comprising:

passing a feed through the pressure vessel for distillation of the feed such that different portions of the feed passes through different columns in parallel to output an upper stream and a lower stream.

8. The process of claim 3, comprising:

positioning a plurality of hangers in the chamber to support the multicolumn assembly within the chamber.

9. The process of claim 8, wherein each of the hangers comprises:

an elongated member positioned in the chamber;

a plurality of spaced apart fastener elements extending from the elongated member;

a plurality of clamping members, each clamping member attached to a distal end of a respective one of the fastener elements.

10. The process of claim 9, wherein each of the clamping members has a slot to receive walls of adjacent columns and at least one engagement element positionable in the clamping member to engage the walls within the slot.

11. The process of claim 10 comprising:

positioning a plurality of riser assemblies so that each of the riser assemblies is positioned in an upper end portion of a respective one of the columns of the multicolumn assembly, walls of bottom portions of adjacent riser assemblies being positioned within the slot for engagement with the at least one engagement element within the slot.

12. The process of claim 1, wherein the providing of the packing units comprises:

connecting a first portion of a first banding element to a first portion of a cradle while the cradle is in an open position;

connecting a second portion of the first banding element to a second portion of the cradle while the cradle is in the open position;

positioning sheets of corrugated material on the first portion of the first banding element and positioning sheets of corrugated material on the second portion of the second banding element while the cradle is open;

closing the cradle so that terminal end portions of the first portion of the first banding element connect with terminal end portions of the second portion of the first banding element to form the first banding element to encircle the sheets of corrugated material to form a first packing unit of the plurality of packing units.

13. The process of claim 12, wherein at least one of the terminal end portions of the first portion of the first banding element has a slot and at least one of the terminal end portions of the second portion of the first banding element has a projection positionable within the slot when the cradle is closed.

14. The process of claim 12, wherein the first banding element comprises at least one seal element and a plurality of protuberances.

15. The process of claim 1 comprising:

positioning a plurality of riser assemblies so that each of the riser assemblies is positioned in an upper end portion of a respective one of the columns of the multicolumn assembly.

* * * * *